United States Patent
Endler et al.

(10) Patent No.: US 11,438,360 B2
(45) Date of Patent: *Sep. 6, 2022

(54) DETERMINING THE INTERSECTION OF A SET OF COMPROMISED CREDENTIALS WITH A SET OF ACTIVE CREDENTIALS WITH DATA STRUCTURES AND ARCHITECTURES THAT EXPEDITE COMPARISONS

(71) Applicant: SpyCloud, Inc., Austin, TX (US)

(72) Inventors: David Endler, Austin, TX (US); Alen Puzic, Austin, TX (US); Edward Ross, Austin, TX (US)

(73) Assignee: SpyCloud, Inc., Austin, TX (US)

( * ) Notice: Subject to any disclaimer, the term of this patent is extended or adjusted under 35 U.S.C. 154(b) by 352 days.

This patent is subject to a terminal disclaimer.

(21) Appl. No.: 16/667,486

(22) Filed: Oct. 29, 2019

(65) Prior Publication Data

US 2020/0137105 A1    Apr. 30, 2020

Related U.S. Application Data

(60) Provisional application No. 62/753,800, filed on Oct. 31, 2018.

(51) Int. Cl.
*H04L 9/40* (2022.01)

(52) U.S. Cl.
CPC ........ *H04L 63/1433* (2013.01); *H04L 63/083* (2013.01); *H04L 63/102* (2013.01); *H04L 63/1416* (2013.01); *H04L 63/1425* (2013.01)

(58) Field of Classification Search
CPC . H04L 63/1433; H04L 63/083; H04L 63/102; H04L 63/1416; H04L 63/1425; G06F 21/577; G06F 21/45
See application file for complete search history.

(56) References Cited

U.S. PATENT DOCUMENTS 7,523,499 B2 * 4/2009 Wilkins ............. H04L 63/1408
726/23
9,275,219 B2 * 3/2016 Cross ................ H04L 63/102
(Continued)

OTHER PUBLICATIONS

David Endler, U.S. Appl. No. 16/667,367, filed Oct. 29, 2019, Detecting Use of Compromised Security Credentials in Private Enterprise Networks.

(Continued)

*Primary Examiner* — Sarah Su

(74) *Attorney, Agent, or Firm* — Pillsbury Winthrop Shaw Pittman, LLP

(57) ABSTRACT

Provided is a process that includes: obtaining, with one or more processors, a query identifying a user identification; retrieving, with one or more processors, via an application programming interface, from a database, one or more passwords associated with one or more user identification entries in the database that matches the user identification in response to the obtained query; determining, with one or more processors, whether the one or more passwords matches a password associated with the user identification; blocking, with one or more processors, access to a user account associated with the user identification and the password when the one or more passwords matches the password associated with the user identification; and notifying, with one or more processors, a user associated with the user account to reset the password when the one or more passwords matches the password associated with the user identification.

106 Claims, 14 Drawing Sheets

(56) References Cited

U.S. PATENT DOCUMENTS

| | | | | |
|---|---|---|---|---|
| 9,355,233 | B1* | 5/2016 | Chen | H04L 9/0891 |
| 10,051,001 | B1* | 8/2018 | Ashley | H04L 63/14 |
| 10,523,686 | B1* | 12/2019 | Mehta | H04L 63/083 |
| 2011/0126273 | A1 | 5/2011 | Bhatia et al. | |
| 2013/0191630 | A1 | 7/2013 | Ylonen et al. | |
| 2013/0191631 | A1 | 7/2013 | Ylonen et al. | |
| 2014/0143401 | A1 | 5/2014 | Carlen et al. | |
| 2016/0006741 | A1* | 1/2016 | Miglani | H04L 63/20 726/1 |
| 2016/0057166 | A1 | 2/2016 | Chesla | |
| 2017/0304707 | A1 | 10/2017 | Morton et al. | |
| 2018/0007087 | A1* | 1/2018 | Grady | G06F 21/31 |
| 2018/0034802 | A1* | 2/2018 | Shelton | H04L 63/083 |
| 2018/0068124 | A1 | 3/2018 | Medvedev | |
| 2018/0166399 | A1 | 6/2018 | Tehranipoor et al. | |
| 2018/0173891 | A1* | 6/2018 | Wang | H04L 63/083 |
| 2018/0191678 | A1 | 7/2018 | Polcha et al. | |
| 2018/0367309 | A1* | 12/2018 | Reinhold | H04L 9/004 |
| 2019/0028557 | A1 | 1/2019 | Modi et al. | |
| 2019/0083876 | A1 | 3/2019 | Morton et al. | |
| 2019/0289017 | A1* | 9/2019 | Agarwal | H04L 63/0838 |
| 2019/0372932 | A1 | 12/2019 | Polcha et al. | |
| 2020/0213334 | A1* | 7/2020 | Kutner | H04L 63/1416 |

OTHER PUBLICATIONS

David Endler, U.S. Appl. No. 16/667,447, filed Oct. 29, 2019, Filtering Passwords Based on a Plurality of Criteria.

David Endler, U.S. Appl. No. 16/667,486, filed Oct. 29, 2019, Determining the Intersection of a Set of Compromised Credentials with a Set of Active Credentials with Data Structures and Architectures that Expedite Comparisons.

David Endler, U.S. Appl. No. 16/667,522, filed Oct. 29, 2019, Detecting Use of Passwords that Appear in a Repository of Breached Credentials.

David Endler, U.S. Appl. No. 16/776,877, filed Jan. 30, 2020, Generating and Monitoring Fictitious Data Entries to Detect Breaches.

David Endler, U.S. Appl. No. 16/777,005, filed Jan. 30, 2020, Measuring Data-Breach Propensity.

Internet archive of https://haveibeenpwned.com/ captured Oct. 30, 2018.

Internet archive of https://breachalarm.com/ captured Oct. 29, 2018.

Internet archive of https://en.wikipedia.org/wiki/Agloe,_New_York captured Oct. 17, 2018.

Hatmaker, Taylor, "Credit Karma expands its identity theft monitoring tool to include dark web data," https://techcrunch.com/2018/04/24/credit-karma-dark-web-id-monitoring/ Apr. 24, 2018.

Internet archive of https://en.wikipedia.org/wiki/Password_policy captured Jan. 21, 2019.

Internet archive of https://haveibeenpwned.com/ captured Mar. 10, 2019.

U.S. Appl. No. 16/667,367 titled "Detecting Use of Compromised Security Credentials in Private Enterprise Networks" filed Oct. 29, 2019.

U.S. Appl. No. 16/667,447 titled "Filtering Passwords Based on a Plurality of Criteria" filed Oct. 29, 2019.

U.S. Appl. No. 16/667,522 titled "Detecting Use of Passwords that Appear in a Repository of Breached Credentials" filed Oct. 29, 2019.

U.S. Appl. No. 16/776,877 tilted "Generating and Monitoring Fictitious Data Entries to Detect Breaches" filed Jan. 30, 2020.

U.S. Appl. No. 16/777,005 titled "Measuring Data-Breach Propensity" filed Jan. 30, 2020.

* cited by examiner

DETERMINING THE INTERSECTION OF A SET OF COMPROMISED CREDENTIALS WITH A SET OF ACTIVE CREDENTIALS WITH DATA STRUCTURES AND ARCHITECTURES THAT EXPEDITE COMPARISONS

CROSS-REFERENCE TO RELATED APPLICATIONS

This application claims benefit of U.S. Provisional Patent Application 62/753,800, titled "Determining the Intersection of a Set of Compromised Credentials with a Set of Active Credentials with Data Structures and Architectures that Expedite Comparisons," filed 31 Oct. 2018. The entire content of each aforementioned patent filing is hereby incorporated by reference.

BACKGROUND

1. Field

The present disclosure relates generally to cybersecurity and, more specifically, to techniques that expedite pair-wise matching between large data sets of compromised credentials and credentials in use.

2. Description of the Related Art

Computer-security professionals are losing the battle to prevent use of stolen or otherwise exposed security credentials, such as passwords, by which users are authenticated by computer networks. In part, this is due to poor, prevalent password hygiene. People tend to reuse passwords or use low-entropy variations. And these passwords (a term used generically herein to refer to knowledge-factor and biometric security credentials), along with associated user identification, can be easily exposed or stolen, which can help threat actors access various sensitive accounts related to a user. A report by Verizon™ in 2017 indicated that 81% of hacking-related breaches leveraged either stolen or weak passwords and in July 2017 Forrester™ estimated that account takeovers would cause at least $6.5 billion to $7 billion in annual financial losses across industries. Other attack vectors include brute force attacks. Modern GPU's and data structures like rainbow tables facilitate password cracking at rates that were not contemplated when many security practices were engineered. Malicious actors can sell resulting tested credentials on the dark web, making it relatively easy to monetize user credentials and incentivizing even more password cracking. Various malicious buyers of this information may use password and user identification combinations in order to breach and retrieve highly confidential information.

To impede these attacks, online services like "Have I Been Pwned" have arisen. Such systems maintain a database of breached credentials and expose an interface by which the records may be interrogated by users seeking to determine if their credentials have been compromised. Such services, however, generally do not scale well for certain types of queries. For instance, time computational complexity of determining the intersection of sets of size m and n increases by m for each item added to set n. In commercial use cases, these numbers may run into the hundreds of millions or billions of records, causing small increases in the number of credentials being analyzed to produce large increases in time computational complexity. These issues are magnified by bandwidth and latency costs associated with each individual comparison with many existing approaches.

SUMMARY

Accordingly, there is a need to be able to efficiently and proactively retrieve exposed or stolen passwords associated with a user identification and to notify a user of an exposed or stolen password in order to prevent account take over.

The following is a non-exhaustive listing of some aspects of the present techniques. These and other aspects are described in the following disclosure.

Some aspects include a process that includes: obtaining, with one or more processors, a query identifying a user identification; retrieving, with one or more processors, via an application programming interface, from a database, one or more passwords associated with one or more user identification entries in the database that matches the user identification in response to the obtained query; determining, with one or more processors, whether the one or more passwords matches a password associated with the user identification; blocking, with one or more processors, access to a user account associated with the user identification and the password when the one or more passwords matches the password associated with the user identification; and notifying, with one or more processors, a user associated with the user account to reset the password when the one or more passwords matches the password associated with the user identification.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
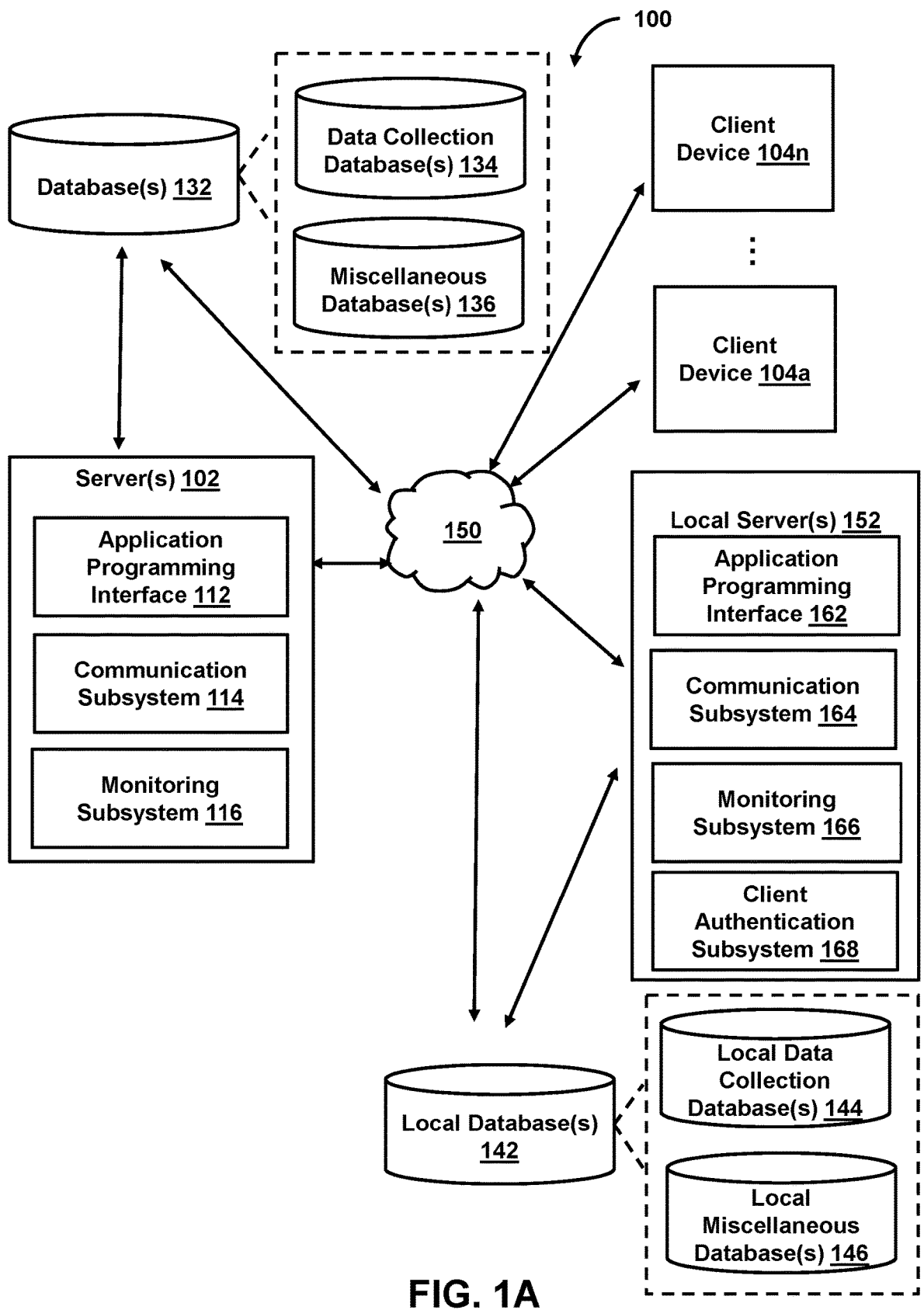
FIG. 1A is a logical and physical architecture block diagram showing an example system for facilitating retrieval of exposed or stolen passwords associated with a user identification and notifying a user of a user account associated with the user identification of an exposed or stolen password in order to prevent account takeover.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, it should be understood that some embodiments are problem-specific, and not all embodiments address every problem with traditional systems described herein or provide every benefit described herein. That said, improvements that solve various permutations of these problems are described below. Some aspects of the present techniques are described below under different headings in all-caps. These techniques may be used together or independently (along with the description above), which is not to suggest that other descriptions are limiting.

Some embodiments mitigate some of the above-described issues (or other problems described below or that will be self-evident to those in the field) by locally caching an instance of compromised credentials and performing batched pair-wise comparisons with a set of credentials in use, in some cases, expending comparisons content-addressable data structures. In some cases, the data sets are relatively large (e.g., involving comparisons between more than 100 million compromised credentials and more than 1 million credentials in use), and some embodiments mitigate bandwidth, storage, and latency issues related to data sets of this size with differential updates and analyses as the data sets evolve over time. In some cases, comparisons are expedited with concurrent operations implemented with compute clusters and heterogenous compute architectures, in some cases mixing non-von Neumann architectures with von Neumann architectures.

FIG. 1A illustrates a computing environment 100 having components configured to detect compromised passwords and impede efforts by a threat actor to exploit the compromised passwords, in accordance with some embodiments. As illustrated in FIG. 1A, computing environment 100 may include servers 102, client devices 104a-104n, databases 132, local databases 142, and local servers 152. Server 102 may expose an application programming interface (API) 112 and include a communication subsystem 114 and a monitoring subsystem 116. Local server 152 may expose an API 162 and include a communication subsystem 164, a monitoring subsystem 166, a client authentication subsystem 168, or other components (which is not to suggest that other lists are limiting).

Three client devices are shown, but commercial implementations are expected to include substantially more, e.g., more than 100, more than 1,000, or more than 10,000. Each client device 104 may include various types of mobile terminal, fixed terminal, or other device. By way of example, client device 104 may include a desktop computer, a notebook computer, a tablet computer, a smartphone, a wearable device, or other client device. Users may, for instance, use one or more client devices 104 to interact with one another, one or more servers, or other components of computing environment 100. It should be noted that, while one or more operations are described herein as being performed by particular components of server 102 or local server 152, those operations may, in some embodiments, be performed by other components of server 102, local server 152, or other components of computing environment 100. As an example, while one or more operations are described herein as being performed by components of server 102 or local server 152, those operations may, in some embodiments, be performed by components of client device 104. Further, although the database 132 and local database 142 are illustrated as being separate from the server 102, local server 152, and the client device 104, the database 132 and the local database 142 may be located within the client device 104, server 102, or local server 152.

Figure 1B:
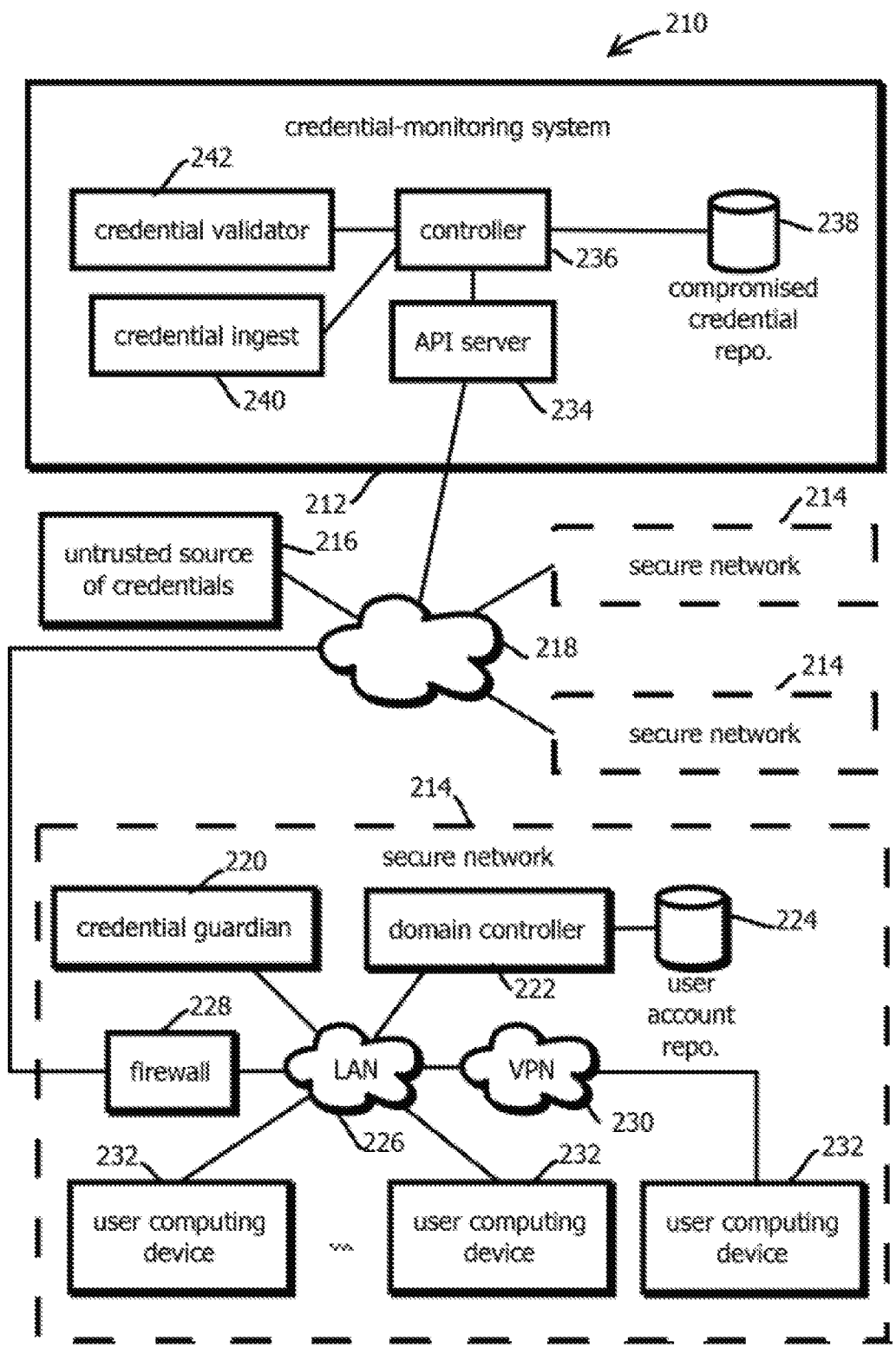
FIG. 1B is a logical and physical architecture block diagram showing another example system for facilitating retrieval of exposed or stolen passwords associated with a user identification and notifying a user of a user account associated with the user identification of an exposed or stolen password in order to prevent account takeover.

FIG. 1B is a logical and physical architecture block diagram showing another example of a computing environment 210 having a credential-monitoring system 212 and a credential guardian 220 configured to mitigate some of the above-described problems. In some embodiments, the computing environment 210 is, in some aspects, a more specific version of that described above. In some embodiments, the computing environment 210 includes the credential-monitoring system 212, a plurality of different secure networks 214, an untrusted source of leaked credentials 216, and a public network, like the Internet 218.

Three secure networks 214 are shown, though embodiments are consistent with substantially more. In some embodiments, each secure network 214 may correspond to a different secure network of a different tenant account subscribing to services from the credential-monitoring system 212, for example, in a software as a service offering, or some embodiments may replicate some or all of the system 212 on-premises. In some embodiments, each of the secure networks 214 may define a different secure network domain in which authentication and authorization determinations are independently made, for instance, a user authenticated on one of the secure networks 214 may not be afforded any privileges on the other secure networks 214 in virtue of the authentication. In some cases, each secure network 214 may be a different enterprise network, for instance, on a private subnet hosted by a business or other organization.

In some embodiments, the secure network 214 may include the above-noted credential guardian 220, a domain controller 222, a user account repository 224, a private local area network 226, a firewall 228, a virtual private network connection 230, various user computing devices 232, and in some cases various network-accessible resources hosted within the secure network for which access is selectively granted by the domain controller 222 responsive to authorization and authentication determinations based on user credentials. Generally, authentication is based on confirming the identity of an entity, and authorization is based on whether that entity is permitted to access resources in virtue of being authenticated. In some embodiments, the user computing devices 232 may be physically co-located, or some user computing devices may be remote, for instance, those connecting via a virtual-private network (VPN) connection 230. Three user computing devices 232 are shown, but commercial implementations are expected to include substantially more, and in some cases with substantially more remote computing devices connecting via a plurality of different VPN connections. In some embodiments, the local area network 226 may be addressed by a range of private Internet Protocol addresses assigned to the various illustrated computing devices, and in some cases, those same private Internet Protocol addresses may be used on other secure networks 214, for instance, behind a network address translation table implemented by the firewall 228 or a router.

In some embodiments, the domain controller 222 is an Active Directory™ domain controller or other identity management service configured to determine whether to service authentication requests from user computing devices 232 or other network resources (e.g., computing devices hosting services to which the devices 232 seek access). In some embodiments, the domain controller 222 may receive requests including a username and one or more security factors, like a knowledge factor credential, such as a password, a pin code, or in some cases, a value indicative of a biometric measurement. The terms "password" and "credential" refer both to the plain-text version of these values and cryptographically secure values based thereon by which possession of the plain-text version is demonstrated, e.g., a cryptographic hash value or ciphertext based on a password. Thus, in some embodiments, these inputs may be received in plain text form, or cryptographic hash values based thereon, for instance, calculated by inputting one of these values and a salt value into a SHA 256 cryptographic hash function or the like, may serve as a proxy.

In some embodiments, the domain controller 222 may respond to authentication requests by retrieving a user account record from the repository 224 corresponding to the username (a term which is used to refer broadly to refer to values, distinct from knowledge-factor credentials, by which different users are distinguished in a username space, and which may include pseudonymous identifiers, email-addresses, and the like) in association with the request. In some embodiments, in response to the request, the domain controller 222 may determine whether a user account associated with the username (e.g., uniquely associated) indicates that the user account has a valid set of credentials associated therewith, for instance, that a password has been registered and has not been designated as deactivated, e.g., by setting a flag to that effect in the account to deactivate a previously compromised (e.g., breached, phished, or brute forced) password. In response to determining that the user account does not have a valid set of credentials associated therewith, some embodiments may respond to the requests by denying the request, and supplying instructions to populate a user interface by which new credentials may be registered and stored in the user account.

In some embodiments, in response to determining that the user account has valid credentials, the domain controller 222 may then determine whether the credentials associated with the request for authentication match those in the user account record, for instance, whether the user demonstrated possession of a password associated with the username in the user account. Possession may be demonstrated by supplying the password in plain text form or supplying a cryptographic hash thereof. In some embodiments, passwords are not stored in plaintext form in the user account repository and cryptographic hashes of passwords in the user account are compared to cryptographic hashes of user input credentials to determine whether the user has demonstrated possession of the password. In response to determining that the credentials associated with the request do not match those in the user account, in some embodiments, the domain controller 222 may respond to the request by transmitting a signal indicating that the request is denied to the requesting computing device 232.

In some embodiments, in response to determining that the credentials supplied with the request match those in the user account, some embodiments may respond to the request by authenticating the user and, in some cases, authorizing (or causing other services to authorize) various forms of access to network resources on the secure network, including access to email accounts, document repositories, network attached storage devices, and various other network-accessible services accessible (e.g., exclusively) on the secure network 214 (e.g., selectively based on the requestor's identity). In some embodiments, upon authentication, various computing devices on the secure network 214 may indicate to one another that they are authorized to access resources on one another or otherwise communicate, e.g., with the Kerbos security protocol, such as the implementation described in RFC 3244 and RFC 4757, the contents of which are hereby incorporated for by reference.

In some embodiments, the domain controller 222, in response to an authentication determination, may advance the user name to a key distribution center service, which may respond by issuing a ticket-granting ticket. The ticket granting ticket may be a time stamped record, and the record may be encrypted with a secret cryptographic (e.g., in a symmetric or asymmetric cryptographic protocol) key of the key distribution center. The ciphertext may be then transmitted to the user computing device 232. The user computing device may store the received ciphertext in memory for use in communicating with other computing devices on the secure network 214.

Subsequently, an authenticated computing device may receive a request to communicate with another computing device on the secure network 214, e.g., from user input or an application thereon seeking to update state. In response, a secure session may be established between the initiating device and the other computing device. To this end, the ciphertext stored in memory of the initiating computing device may be transmitted to the key distribution center, for instance to its ticket granting service. The ciphertext may be sent in association with an identifier of the computing device to which the requesting computing device has been requested to communicate. The ticket granting service may verify the name of the computing device to which communication is requested, for instance, confirming that it is on a list of permitted computing device identifiers, and the ticket granting service may determine that the ciphertext (e.g., upon decryption or signature verification with a public key) indicates that the ticket is not expired and that the ticket was encrypted with the ticket granting service's secret key. (A negative determination either of these determinations may result in a determination not to authorize the session in some embodiments.) In some embodiments, the ticket granting service may issue a ticket and session keys to the requesting computing device, which may then be sent to the other computing device to which communication is requested. The other computing device may verify the ticket and the session keys to determine whether to respond to the request. Communications in the session may be associated with these values, and each device may verify that each message in the session demonstrates possession by the other device of the appropriate credentials.

In some embodiments, the ciphertexts may expire and be renewed. For instance, some embodiments may determine based on the timestamp of a current ciphertext (or session credentials) by the ticket granting service, the ciphertext is expired, and embodiments may cease to be operative to authorize communication between computing devices. In some embodiments, the user computing device associated with the ciphertext may detect that the ciphertext has expired and automatically request an updated ciphertext. In some embodiments, the determination to grant an updated ciphertext may include querying the credential guardian 220 to determine whether the user credentials upon which the initial authentication determination were based have been subsequently compromised and detected by the credential monitoring system 212. In such an event, in some embodiments, the domain controller 222 and user computing device 232 may receive a message from the ticket granting service indicating that the domain credential guardian 220 indicates the credentials are compromised and declined to renew the ciphertext (or session credentials), thereby preventing subsequent communication based upon the compromised user credentials. In some embodiments, the user may be invited to designate new user credentials by sending a message to the user computing device 232 instructing the user computing device 232 to present the interface by which new credentials are registered with the domain controller 222.

In some embodiments, the domain controller 222 is an Active Directory™ domain controller, and the secure network 214 is a Windows™ domain network. In some embodiments, the credential guardian 220 periodically or in response to various events obtains credentials that have been compromised from the credential-monitoring system 212, for instance every 15 minutes, every hour, every day, or every week, or in response to an event, like a new credential, a new compromised credential, or the like.

In some embodiments, in response, the credential guardian 220 may obtain an updated set of compromised credentials, and in some cases with an update that is based on, and specifies, a difference relative to a previous update to reduce bandwidth and memory usage.

Some embodiments may iterate through a set of updated compromised credentials or existing credentials in the user account repository 224 to compare the credentials in the user account repository with those that have been designated by the credential monitoring system 212 as having been compromised. In some embodiments, the domain controller 222 may be configured to transmit a message indicating a new credential event to the credential guardian 220 when (e.g., in response to an event in which) a user changes or adds new credentials, and the credential guardian 220 may execute a comparison between the new credentials, for instance applied in the message or associated with the message to those that have been previously designated by the credential-monitoring system 212 as having been compromised. In some embodiments, the comparison is performed within the secure network 214 by the credential guardian 220 via a comparison to downloaded compromise credentials, for instance, to avoid transmitting credentials from the user account repository outside the secure network 214 and to expedite the comparison. Or in some cases, the comparison may be performed remotely by the credential-monitoring system 212, for instance, by transmitting the new credentials in the updated user account record to the credential monitoring system 212 to perform the comparison and send a message indicating a result. In some cases, the transmitted credential may be transmitted in the form of a cryptographic hash of that credential for comparison with cryptographic hashes of compromised credentials using the same cryptographic hash function and salt, like SHA 256 or MD5 hashes, so that comparisons are performed without having access to the credential outside the secure network 214.

Scaling is expected to present challenges with naïve approaches in some implementations. In some embodiments, the number of compromised credentials and the number of credentials in the user account repository may be relatively large, for instance, greater than 100,000, greater than 1 million, greater than 10 million, or greater than 100 million distinct entries corresponding to different distinct sets of credentials (e.g., password/username pairs). Performing a pairwise comparison between the two sets may be a relatively computationally expensive operation, particularly when the comparisons are time sensitive operations to detect potential breaches. Various data structures may be implemented to expedite the operation. Examples include content addressable data structures. For example, embodiments may compare the two sets (e.g., determine the intersection by selecting each entry in one set also present in the other) with a hash table. Some embodiments may store (e.g., store a pointer to, or store a copy of) a compromised credential or subset of the compromise credentials at an address in an array that corresponds to some or all of an output of a hash value based on the credential stored at that address. For example, a 10 digit prefix or suffix of a SHA 256 cryptographic hash of a credential may serve as an index into an array where compromised credentials that produce the same prefix or suffix in the same cryptographic hash function are stored. Some embodiments may perform a comparison by inputting the credential in question from the user account repository into the same hash function, determining the same prefix or suffix as an index into the same array, retrieving each of the compromised credentials at that address, and comparing each of the responsive compromised credentials to the credential in question in the user account repository 224, thereby relatively rapidly identifying a relatively small subset of compromised credentials to compare.

Other embodiments may implement other data structures to expedite the comparisons. Examples include implementations that store compromised credentials in binary trees (e.g., and implement a binary search), sorted lists, prefix trees, radix trees, or other data structures that afford relatively fast access to entries based upon the content of those entries, such that for a given credential from the user account repository 224, potentially matching compromised credentials can be identified relatively quickly (or vice versa). In some embodiments, comparisons may be performed probabilistically, for instance, with a bloom filter or a cuckoo filter.

Some embodiments may expedite comparisons through concurrent operations. For example, some embodiments may perform comparisons in a MapReduce framework, for instance mapping sets of compromised credentials and sets of user account credentials to nodes in a cluster computing architecture based on hashes thereof, and reducing out results indicating which credentials match those that have been compromised with a reducing function. In some cases, concurrency may be expedited with heterogenous processing hardware. Some embodiments may implement concurrency with comparisons on a graphical processing unit, for instance performing relatively large number of concurrent comparisons with concurrently operating pixel shaders. Some embodiments may implement the comparison with field programmable gate arrays or other bespoke hardware, for instance, on content addressable memory implemented in a hardware associative array in which a term in a query maps to set of physical hardware addresses by a random-access memory architecture.

In some cases, comparisons are performed sequentially for different parts of a set of credentials, e.g., first usernames of username/password pairs may be compared to produce a set of partial matches, and then passwords may be compared within the set of partial matches to produce a set of full matches. In some cases, usernames may be matched on a character-by-character, exact basis. Or some embodiments may designate usernames with some amount of difference as matching. For example, some embodiments may parse domain names from email-usernames, e.g., stripping the @mailsever and dot com, from an email address, and then matching to the remaining prefix to detect instances in which the same prefix is used as a username on other services. Some embodiments may match usernames within a threshold edit distance, like within a threshold Levenshtein distance. Some embodiments may apply stemming wildcard operators by which threshold amounts of prefix or suffix characters are disregarded when matching or serve as the exclusive basis for matching within the username field. Some embodiments normalize usernames to a canonical representation and then match the canonical representation, e.g., by converting all characters to the same case (e.g., uppercase) and stripping suffixes designating domain names.

In some embodiments, the credential guardian 220 may register various usernames, passwords, or cryptographic hashes thereof with the credential monitoring system 212, and the credential monitoring system 212 may determine (e.g., with any of the preceding comparison techniques) whether values related to the registered usernames, passwords, or cryptographic hashes thereof have appeared in records of compromised credentials. In response to detecting this scenario, the credential monitoring system 212, in some cases, may transmit a message, such as an event record, to the credential guardian 220, and an event handler of the credential guardian 220 may disable the corresponding credential via the domain controller 222 by sending an instruction to the domain controller 222 to update a corresponding user account record to designate the credential as invalidated, causing the domain controller 222 to force the user to supply a new set of credentials in some cases.

Thus, comparisons may be performed on the credential guardian 220, in the (e.g., remote or on-premises) credential-monitoring system 212, and comparisons may be performed responsive to an updated set of compromised credentials, an attempt to use a credential, a new credential a user is attempting to register, or a periodical batch process being run.

In some embodiments, the credential guardian 220 and the credential monitoring system 212 may be co-located on the same secure network 214, or in some cases portions may be implemented as a software as a service model in which the same credential-monitoring system 212 is accessed by a plurality of different secure networks 214 hosted by a plurality of different tenants. The credential guardian 220 and the credential monitoring system 212 collectively form an example of a distributed application that is referred to as a distributed credential-monitoring application. Other examples of such an application are described with reference to FIG. 1A. The components are described as services in a service-oriented architecture (e.g., where different functional blocks are executed on different network hosts (or collections thereof) and functionality is invoked via network messages). But embodiments are consistent with other design patterns, e.g., the credential guardian 220 and the domain controller 222 may be integrated in the same host or process, the credential guardian 220 may operate as an agent on each of the user computing devices, or the credential guardian 220, the domain controller 222, and the credential-monitoring system 212 may be integrated on a single host or process.

In some embodiments, the credential-monitoring system 212 may include an application program interface server 234, such as a nonblocking server monitoring a network socket for API requests and implementing promises, callbacks, deferreds, or the like. In some embodiments, the controller 236 may implement the processes described herein by which credentials are obtained, and in some cases cracked, validated, stored, and interrogated. In some embodiments, at the direction of the controller 236, for instance responsive to commands received via the server 234, credentials stored in a compromised credential repository 238 may be interrogated to return an updated full set, or result of comparison to credentials determined to have been potentially compromised with the techniques described herein. In some embodiments, the controller 236 is further configured to ingest credentials with the credential ingest module 240 from various remote sources, such as an untrusted source of credentials 216 via the Internet 218. Examples of sources of credentials are described below and include various repositories on the dark web. In some embodiments, received credentials may undergo various types of processing with credential validator 242, for instance, de-duplicate credentials with those previously determined to have been compromised, cracking credentials published in encrypted form, and associating credentials with other user identifiers. Results may be stored in the compromised credential repository 238 and in some cases, one or more the above-described data structures by which compromised credentials are compared with those in user account repository 224 may be updated.

The systems of FIGS. 1A and 1B may execute various processes like those described below, though the following processes are not limited by the above implementations, which is not to suggest that any other description herein is limiting. It should be noted that the various processes executed by one or more components of the secure network 214 in FIG. 1B may be executed by one or more of local server 152, client device 104, and local database 142 in FIG. 1A (or vice versa), and the various processes executed by one or more components of the credential-monitoring system 212 in FIG. 1B may be executed by one or more of server 102 and database 132 in FIG. 1A (or vice versa). In other words, the above or below discussed processes executed by one or more components of the computing environment 210 may be executed by one or more components of the computing environment 100 (or vice versa).

Obtaining Compromised Confidential Information

Various approaches may be executed to obtain compromised (e.g., breached, brute forced, or phished) confidential information, like compromised credentials, leaked personally identifiable information (like social security numbers), or financial credentials like account numbers, for purposes of detecting that the information has been compromised. The database 132 and local database 142 illustrated in FIG. 1A or the repository 238 of FIG. 1B may be populated by collecting data from a plurality of sources and using a plurality of data collection techniques. Although a compromised credential repository 228 is illustrated in FIG. 1B as being part of a credential-monitoring system 212, it should be understood that secure network 214 may also include another repository including compromised credentials (i.e., the compromised credentials stored in the compromised credential repository 228). Data corresponding to leaked or stolen assets (including user credentials) may be collected using multiple techniques and from many sources. Some of the techniques for collecting leaked or stolen assets include (a) human intelligence (HUMINT) and applied research (HUMINT+TECHNOLOGY) and (b) scanners and automatic collection tools. HUMINT is an information gathering technique that uses human sources, and may include such a human source acquiring a copy of a set of compromised credentials from the dark web. Both the techniques noted above may be implemented in some cases. Although the scanners and automatic collection tools may be relatively efficient at collecting information from the regular web, manual techniques may be needed in some use cases to collect leaked or stolen assets from the deep or dark web, which is not to suggest that purely automated approaches or any other technique is disclaimed.

The above noted techniques, alone or in combination, collect data from several sources. These sources include, but are not limited to (which is not to imply other lists are limiting), private sources, covert sources, active account takeover (ATO) combination lists, stolen assets, infected users, open sources, private forums, dark web markets, tor hidden services, and pastes. Once the data is collected, the data may be cleansed by putting the collected data through a rigorous quality-control process to determine the value of the collected data. After the data is cleansed, a database may be populated based on the cleaned data.

Figure 2:
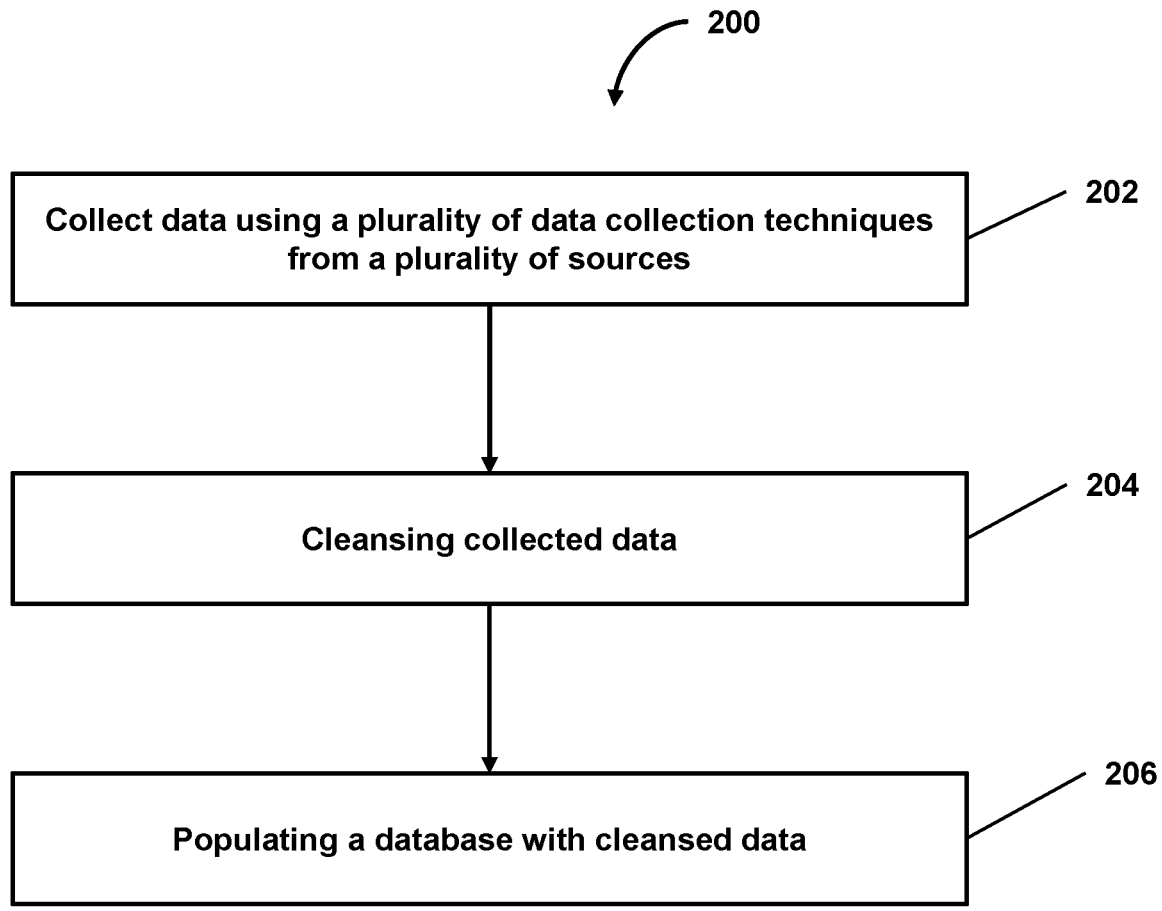
FIG. 2 is a flow chart that illustrates an example process of populating a database suitable for use in the system of FIG. 1A or 1B.

FIG. 2 illustrates an example process 200 of obtaining compromised credentials. The process 200, like the other processes described herein, may be implemented by executing instructions stored on a tangible, machine-readable medium with one or more processors, in some cases, with different processors executing different subsets of the instructions and with different physical memory or computing devices storing different subsets of the instructions. The processes (which includes the described functionality) herein may be executed in a different order from that depicted, operations may be added, operations may be omitted, operations may be executed serially, or operations may be executed concurrently, none of which is to suggest that any other description is limiting. In some embodiments, the processes herein may be implemented in one or more processors (e.g., a term which refers to physical computing components, like a central processing unit, a GPU, a field-programmable gate array, application-specific integrated circuits, and combinations thereof). The processing devices may include one or more devices executing some or all of the operations of the method in response to instructions stored on an electronic, magnetic, or optical storage medium.

In step 202, in some embodiments, data (for example, exposed or stolen data related to personally identifiable information) may be collected using a plurality of data collection techniques from a plurality of sources.

After the data is collected, in step 204, the collected data may be cleansed by putting the data through a rigorous quality-control process to determine the value of the collected data. The cleansing of the collected data may include several steps (examples of which are discussed in more detail below with reference to FIG. 3). The cleansing steps include parsing, normalizing, removing duplicates, validating, and enriching. Once the data is cleansed, in step 206, a database may be populated with the cleansed data. This data may then be used to efficiently retrieve exposed or stolen passwords associated with a user identification and notify a user of a user account associated with the user identification in order to prevent account take over.

Figure 3:
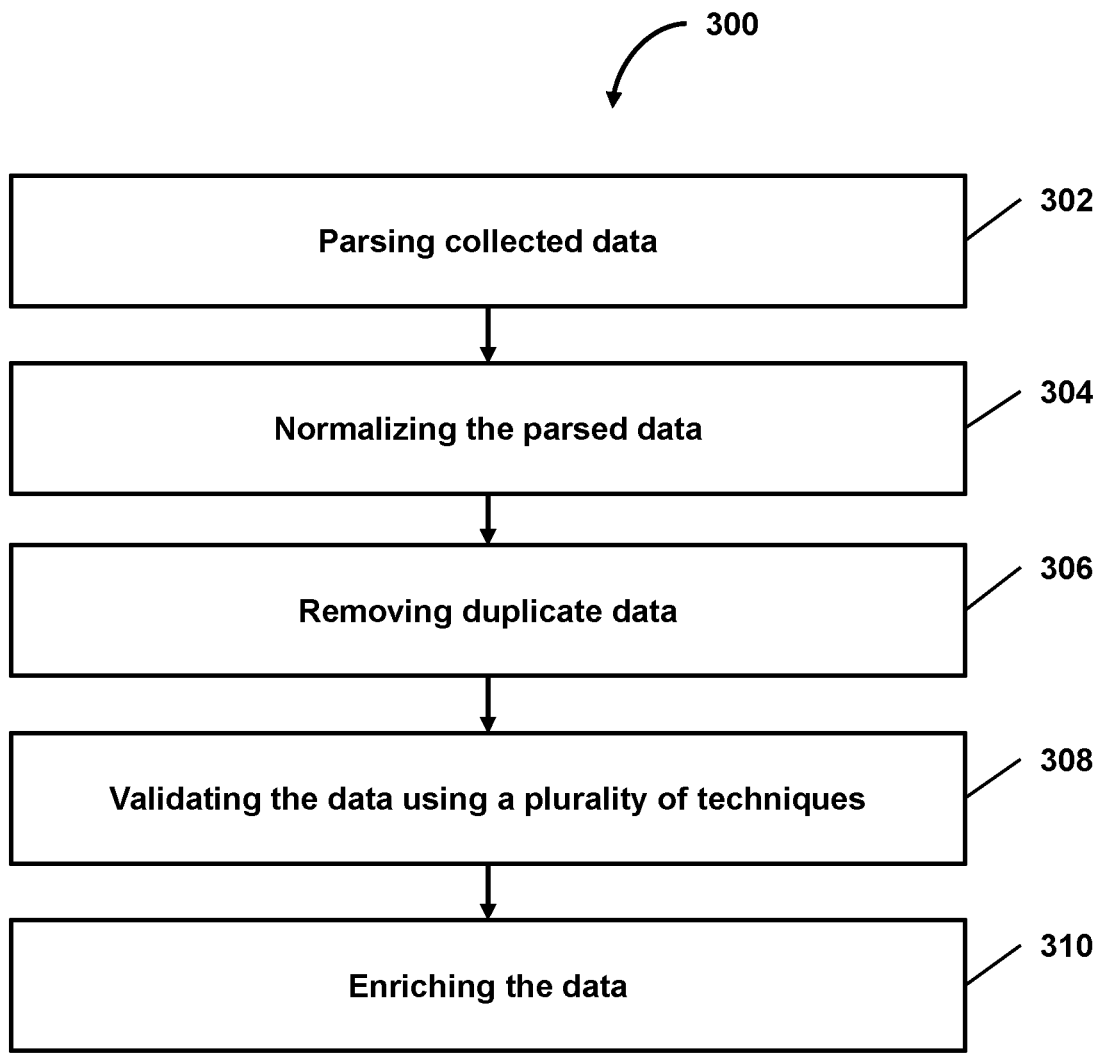
FIG. 3 is a flowchart describing an example of a process of cleansing collected data.

FIG. 3 illustrates an example process 300 of cleansing collected data described in step 204 in FIG. 2. In step 302, in some embodiments, the collected data is parsed and the parsed data is normalized in step 304. During the normalization process, in some embodiments, the data is parsed and classified into different fields (for example, date of birth, user name, password, domain name, etc.). Also, during the normalization process (or during any step illustrated in FIG. 3), data that is not relevant may be deleted. For example, data records that do not include passwords or high value personal identification information may be discarded.

In step 306, duplicate data may be removed. During this step, in some embodiments, the normalized data may be compared to more than one or ten billion assets already stored in the database 132 (for example, the data collection database 134) or local database 142 (for example, the data collection database 144) and data that are duplicates may be discarded. In some cases, the above techniques configured to expedite pairwise matching of sets may be implemented to perform deduplication. Although duplicate data may be discarded, the database 132 or local database 142 may keep a record of a number of duplicates that were retrieved from unique sources.

In step 308, the data may be then validated using a plurality of techniques. Routines such as "validation rules," "validation constraints," or "check routines" may be used to validate the data so as to check for correctness and meaningfulness. The rules may be implemented through the automated facilities of a data dictionary, or by the inclusion of explicit application program validation logic.

Finally, in step 310, the data may be enriched so that the database 132 (for example, the data collection database 134) or local database 142 (for example, the data collection database 144) may be populated with, for example, how many times user credentials have been ingested from a unique source, the severity of each individual record, and additional metadata combined from different sources.

The populated database 132 (for example, the data collection database 134 or repository 238) or the local database 142 (for example, the data collection database 144) may take a number of forms, including in memory or persistent data structures, like ordered/unordered flat files, Indexed Sequential Access Method (ISAM), heap files, hash buckets, or B+ trees. In some embodiments, the data may be relatively Retrieval of Data Associated with a User Identification Via an External Computer System to Prevent Account Takeover As noted above, exposed or stolen passwords are a problem across industries. Some of the present techniques afford efficient and proactive ways of retrieving compromised confidential data (for example, exposed passwords) that are associated with a user identification, notifying a user of a user account of the exposed password associated with the user account. FIG. 1A illustrates a system that facilitates efficient and proactive ways of retrieval of exposed passwords associated with a user identification and notification of the exposed passwords to prevent account takeover. In some embodiments, a user may request to access a user account using a user credential (for example, a user identification (such as a user name) and a password associated with the user identification) via a client device 104. The request may be sent to the local server 152 via network 150 and received by the local server 152 via the communication subsystem 164. Alternatively, in some embodiments, the request to access the user account may be sent to the local 152 via an internal network (not shown) that connects the client device 104 and the local server 152. In response to the received request, the communication subsystem 164 may forward the request to a client authentication subsystem 168. The client authentication subsystem 168 may determine whether to grant access to the user (for accessing the account) based on the user identification and password combination received from the client device 104.

In some embodiments, in response to receiving the user credentials from the client device 104, the client authentication subsystem 168 may compare the received user credential with stored user credentials (for example, stored in the local miscellaneous database 146). If the received user credential matches one or more user credentials stored in the local miscellaneous database 146, the client authentication subsystem 168 grants access to the user to access the user account via the communication subsystem 164. Accordingly, the user of the client device 104 is allowed to access the user account to which he/she has been granted access.

Alternatively, in some embodiments, the client device 104 may hash the password entered by the user of the client device 104, and then send the user credentials (for example, user identification and hashed password) to the local server 152 for authentication. Since user credentials may be intercepted via the network 150, the client device 104 may hash the password prior to sending it to the local server 152 for authentication. In such a case, the local server 152 may receive the hashed password and may compare the hashed password to other hashed passwords that are stored in the local miscellaneous database 146. In other words, the local miscellaneous database 146 may store user credentials that include a user identification and hashed passwords associated with the user identification. This way, the received hashed password is compared with hashed passwords stored in the miscellaneous database and when there is a match between the received user credential (for example, the received user identification and hashed password) and one or more user credentials (for example, one or more user identifications and hashed passwords) stored in the miscellaneous database 146, the client authentication subsystem 168 grants access to the user to access the account via the client device 104. Although the description above indicates that a user enters a user identification and password to access an account, it should be understood that this may be an automated process. In other words, client device 104 may be automated to access an account by entering a user credential and password and the local server 152 may determine whether to grant access to the user account based on such automation.

In some embodiments, an example of the local server 152 may be a domain controller (like domain controller 222 of FIG. 1B) that runs Active Directory domain services. The domain controller may authenticate and authorize all users and computers (for example, client device 104) in a windows domain type network by assigning and enforcing security policies for all computers and installing or updating software. For example, when a user logs into a computer (for example, client device 104) that is part of the windows domain, domain controller may check the submitted password and determine whether the user is a system administrator or a normal user. Based on a match of the user credentials of the user with stored user credentials (for example, stored in the local miscellaneous database 146), the domain controller may determine whether to grant access to the user as a system administrator or a normal user. In some embodiments, the local server 152 may be any server that authenticates any user account. For example, in some embodiments, the local server 152 may be a server associated with a website or a company, and the local server 152 may grant access to the web site or information within the company's network when the user credentials match stored user credentials. In this example, the client device 104 may be a customer that seeks to access a website using the customer's user credentials or may be an employee of a company that seeks to access information within a company's network. In some embodiments, the server 102 may be a third party server that offers services of providing data (for example, exposed or stolen user credentials) associated with, for example, a user account to prevent account take over (e.g., prevent hacking) of the user account.

In some embodiments, once the local server 152 grants access to the user of the client device 104 to access a user account, the client 104 or the local server 152 (via the communication subsystem 164) may automatically generate a query and send the query, via the network 150, to the server 102 in order to retrieve data (for example, one or more exposed passwords) associated with the user identification. The query may identify a user identification (for example, that was entered by the user of the client device 104 to access a user account). The query may also identify other information related to the user identification and the user, for example, location of access by the user (e.g., IP address) and date and time of access by the user. The query may be obtained by the server 102 via SSL (Secure Sockets Layer), TLS (Transport Layer Security), or various other protocols. In some embodiments, a query does not necessarily have to be sent to the server 102 in response to the user logging (or attempting to login) into a user account using the user credentials. The query may be sent to the server 102 at another time and may identify a plurality of user identifications associated with a plurality of users and user accounts. For example, the local server 152 (or a client device 104 acting as an administrator) may request retrieval of exposed passwords associated with a plurality of user accounts. Accordingly, the local server 152 (or client device 104) may generate a query that identifies a plurality of user identifications and send the query to the server 102 (for example, via network 150) in order to retrieve data (for example, exposed passwords) associated with the plurality of user identifications (which may be associated with one or more user accounts). The query may include a request for exposed passwords directed to the API 112 in the server 102. In some embodiments, the query (for example, identifying one or more user identifications or other data associated with the one or more user identifications) may be automatically generated at a predetermined time set by the local server 152 or client device 104 (for example, an administrator).

In some embodiments, the query may be received by the server 102 (for example, via the communication subsystem 114) and may be routed to the API 112. In response to the query, the API 112 may generate a database query configured to retrieve data related to the user identification (which may be identified in the query) from the database 132 (for example, data collection database 134). Prior to sending the search query, the server 102 may determine one or more criteria for the search query to make the search process more efficient. The search query may be an SQL (Structured Query Language), an MDX (Multidimensional Expressions) query, or the like.

In some embodiments, one or more criteria for the search query may be generated by the server 102 based on various factors. For example, a criterion of the search query (e.g., a value of a field in a where clause) may be determined based on whether another query identifying the same user identification has been previously obtained. In other words, the server 102 (for example, the monitoring subsystem 116) may determine whether the user identification (that is received in the current query) has also been previously obtained in one or more previous queries. Whenever a query identifying a user identification is obtained, the server 102 may keep a record (for example, metadata related to the query) of such a query in its miscellaneous database 136. Such a record may include a date and time of the obtained query, a location (for example, IP address) from where the query is received, a user identification identified in the obtained query, or various other data related to the user identification and the obtained query.

In some embodiments, in response to receiving a query identifying the user credential, the server 102 may retrieve data (e.g. metadata), via the API 112, from the miscellaneous database 136, associated with one or more user identification entries in the miscellaneous database 136 that matches the user identification in the received query. In other words, the server 102 may retrieve (for example, from the miscellaneous database 136), via the API 112, other information related to the previously obtained query when (e.g., in response to an event in which) the user identification in the current query matches one or more user identifications stored in the miscellaneous database 136. For instance, the server 102 may retrieve a previous date and time the user identification was obtained in the previous query, and use this date and time to generate a search criterion for the search query. When it is determined that the user identification has been previously obtained in another query, the search for data related (for example, one or more exposed passwords related to the user identification) to the user identification from the database 132 (for example, the data collection database 134) may be limited to, for example, data that has been populated on or after the date (or time) the user identification was previously obtained in the other query. In some embodiments, when (e.g., in response to an event in which) the server 102 (via, for example, the monitoring subsystem 116) determines that another query identifying the same user identification (which was identified in the current query) has been previously obtained, the server 102 may generate a search criterion such that data (related to the user identification) that is retrieved from the database 132 (for example, data collection database 134) corresponds to data that was populated into the database 132 (for example, data collection database 134) on or after a date or time of the previously obtained query. In this example, data collection database 134 may include the data collected, cleansed, and populated, as described above with regard to FIGS. 2 and 3, and miscellaneous database 136 may include other miscellaneous data (for example, information regarding time and date of a received query, a location of a received query, etc.) related to user identifications.

In some embodiments, once the search query and the search criterion are generated, data (for example, one or more passwords) associated with one or more user identification entries in the data collection database 134 that matches the user identification identified in the current query is retrieved, via the API 112, from the database 132 (for example, data collection database 134) based on the search query and the criterion for the search query. In some embodiments, when (e.g., in response to an event in which) it is determined that the user credential has not been previously identified in previous query, the search criterion may cause embodiments to require the entire data collection database 134 to be searched in order to retrieve data (for example, one or more passwords) associated with one or more user identification entries in the database that matches the user identification identified in the current query. On the other hand, when (e.g., in response to an event in which) it is determined that the user credential has been previously identified in a previous query, the search criterion may cause embodiments to require only a portion of the data collection database 134 (the portion that includes data populated on or after the date or time the previous query was obtained) to be searched in order to retrieve data (for example, one or more passwords) associated with one or more user identification entries in the database that matches the user identification identified in the current query. Accordingly, server 102 may retrieve, via the API 112, from a portion of the data collection database 134, data (for example, one or more passwords) associated with one or more user identification entries in the data collection database 134 that match the user identification identified in the current query. The database 132 may be indexed in such a manner that data populated in the data collection database 134 at different times can be easily distinguished during a search process. In some embodiments, the data retrieved from the data collection database 134 may include metadata associated with the one or more passwords retrieved from the data collection database 134. Such metadata may include a date of exposure of the one or more passwords, a number of exposures of the one or more passwords, or a location of exposure of the one or more passwords.

This makes the data retrieval process more efficient relative to simpler data access techniques. Allowing the search to be performed on only a portion (or subset) of a database decreases the time taken to retrieve data associated with the user identification, reduces the use of computer resources of, for example, the server 102, and provides the retrieved data to a recipient sooner so that the recipient may act on the such data in a quicker manner, thereby preventing account takeover sooner than later. In other words, in some embodiments, the entire database may not need be searched and only a portion (or subset) of the database may need to be searched to retrieve data related to the user identifications, none of which is to suggest that simpler data access techniques or any other subject matter are disclaimed.

In some embodiments, the data retrieved from the data collection database 136 may include, for example, one or more passwords associated with the user identification. The data may also include security questions and answers associated with a user account (associated with the user identification). The monitoring subsystem 116 may analyze the retrieved one or more passwords and determine which of the one or more passwords are plaintext passwords (as compared to encrypted passwords). The monitoring subsystem 116 may distinguish between the plaintext and non-plaintext passwords, and may classify these passwords based on whether they are plaintext or non-plaintext passwords. Once the passwords are sorted into plaintext or non-plaintext passwords and when it is determined that at least one of the retrieved passwords is a plaintext password, the communication subsystem 114 may send the plaintext passwords to the local server 152. Further, in some embodiments, the monitoring subsystem 116 may determine whether there are overlapping passwords (for example, overlapping plaintext passwords associated with a user identification) that have been retrieved. If there are overlapping passwords, the monitoring subsystem 116 may sort the non-overlapping passwords and the server 102 may send the non-overlapping passwords to the local server 152.

In some embodiments, the monitoring subsystem 116 may use, for example, rainbow tables for cracking the non-plaintext passwords. Compromised credentials in encrypted or hashed form may be cracked in advance of queries against these credentials, e.g., before matching the results to credentials being tested, in order to expedite operations, as password cracking is often a relatively computationally expensive operation. Rainbow tables are large sets of pre-computed tables filled with hash values that are pre-matched to possible plaintext passwords. The rainbow tables may be stored in the miscellaneous database 136. In some embodiments, the monitoring subsystem 116 may perform brute-force attacks (e.g., of iteratively guessing every possible combination of a password) or dictionary attacks (e.g., by loading a password cracking dictionary containing hundreds of thousands of commonly used passwords and see if it gets any hits) in order to crack the non-plaintext passwords. The results of cracking the passwords (using rainbow tables, performing brute-force attacks, or performing dictionary attacks) may be communicated to the local server 152.

The retrieved data (for example, one or more passwords) from the data collection database 134 may be temporarily stored in the miscellaneous database 136 along with the user identification. Temporarily storing the retrieved data associated with the user identification in the miscellaneous database 136 may allow retrieval of such data in view of a subsequent query (identifying the user credential) received from the local server 152 or another server (not shown). Such temporary storage may be helpful to retrieve data quickly from miscellaneous database 136 (compared to retrieving the data from the data collection database 134, which may take more time) when subsequent one or more queries (identifying the same user credential) is obtained from one or more sources within a predetermined amount of time. In some cases, it may be quicker to retrieve data associated with the user credential from the miscellaneous database 136 (which may be smaller than the data collection database 134). Retrieving the data associated with the user identification from miscellaneous database 136 may use fewer computer resources (compared to retrieving the data associated with the user identification from the data collection database 134) of the server 102. Further, retrieving the data associated with the user identification from miscellaneous database 136 may result in providing the retrieved data to a recipient (for example, the local server 152 or any other external computer system) sooner so that the recipient may act on such data in a quicker manner, thereby preventing account takeover sooner than later.

In some embodiments, the retrieved data may include metadata associated with the one or more retrieved passwords. Such metadata may include a date and time of exposure of the one or more passwords, a number of exposures of the one or more passwords, or a location of exposure of the one or more passwords. The date and time of exposure of the one or more passwords may correspond to the date and time at which the one or more passwords was collected during the collection of data using a plurality of data collection techniques from a plurality of sources in step 202 of FIG. 2. During the step of collecting data in step 202 of FIG. 2, the collected data may be correlated with a date and time of collection of the data. In some embodiments, the date and time of exposure of the one or more passwords may correspond to the date and time at which the one or more passwords was exposed within the source.

In some embodiments, the retrieved data may include a number of exposures of the one or more passwords. For example, the same password associated with a user identification may be exposed within a plurality of sources. Accordingly, a record might be kept in the data collection database 134 regarding a number of exposures of the same password. In other words, the data collection database 134 may keep a record of a number of sources from which the same password (associated with the user identification) was collected during the data collection and data cleansing steps illustrated in FIGS. 2 and 3. Further, in some embodiments, the retrieved data may include a location of exposure of the one or more passwords. During the data collection step 202, a record may be kept of the location from which the data is collected. For example, a password (associated with a user identification) may have been exposed on the dark web or a blog post, and such information regarding the location of the exposure may be collected during the data collection step 202 in FIG. 2 and may be retrieved in response to a query identifying the user identification. Such retrieved data may be sent to the local server 152 (i.e., received by the local server 152) in response to a query identifying the user identification. It should be understood that all the data retrieved by the server 102 may be sent to the local server 152.

Further, in some embodiments, the retrieved data may correspond to security questions and answers associated with a user identification. In some embodiments, retrieved data may not include one or more passwords. Instead, the retrieved data may include security questions and answers associated with a user identification. Such retrieved data may be sent to the local server 152 (or client device 104) along with metadata associated with the security questions and answers. Such metadata may include a date and time of exposure of the security questions and answers, a number of exposures of the security questions and answers, or a location of exposure of the security questions and answers. In some embodiments, the retrieved data may include one or more passwords associated with the user identification in addition to the security questions and answers associated with the user identification.

In some embodiments, the server 102 (for example, the monitoring subsystem 116) may set reminders to search the data collection database 134 for additional exposed passwords associated with the user identification within a predetermined amount of time after the query (identifying the user identification) is obtained. The reminder may also be set to request the local server 152 (or client device 104) to provide instructions on whether the local server 152 (or client device 104) may determine to search the data collection database 134 for additional exposed passwords associated with the user identification within a predetermined amount of time after the query (identifying the user identification) is obtained. The reminder may be set based on a number of retrieved plaintext passwords (or a number of retrieved passwords—including both plaintext and non-plaintext passwords). Additionally, the predetermined amount of time may vary based on the number of retrieved plaintext passwords (or a number of retrieved passwords—including both plaintext and non-plaintext passwords). For instance, the predetermined amount of time may be inversely proportional to the number of retrieved passwords. The miscellaneous database 136 may store such reminders.

Further, in some embodiments, an operation to search the data collection database 134 for exposed passwords within a predetermined amount of time after the query (identifying the user identification) is obtained may be scheduled based on a date of exposure (for example, a latest date of exposure) of the retrieved one or more passwords that is a plaintext password. The monitoring subsystem 116 may determine which of the retrieved one or more passwords is a plaintext password and may determine a date of exposure of the retrieved one or more passwords based on the retrieved metadata associated with the one or more passwords. The monitoring subsystem 116 may determine a latest exposure date among the exposure dates of the retrieved one or more passwords, and may set a reminder to search the database for exposed passwords associated with the user identification within a predetermined amount of time based on the latest date of exposure. In some embodiments, the scheduled operation may also be configured to request the local server 152 (or client device 104) to provide instructions on whether the local server 152 (or client device 104) may determine to search the data collection database 134 for additional exposed passwords associated with the user identification within a predetermined amount of time after the query (identifying the user identification) is obtained.

In some embodiments, the retrieved passwords described above may be strings of alpha numeric characters. Further, in some embodiments, the retrieved passwords may be biometric attributes, like facial recognition data, fingerprint data, or various other types of data that allow access to a user account. The user identification may be may be various forms of identification used to access a user account. In some embodiments, the user identification may include a user name or a user name and a domain name (for example, john.smith@gmail.com). Further, in some embodiments, the user identification may be strings alpha numeric characters or may be various form of identification that uniquely identifies a user within a system's username space.

Further, in some embodiments, when a query identifying a user identification is obtained, the server 102 may parse the user identification to obtain a user name and a domain name. For example, if john.smith@gmail.com is a user identification that is obtained, then the server 102 may parse this user identification to obtain a user name (for example, john.smith) and a domain name (for example, gmail.com). Based on the obtained user name, for example, john.smith, the server 102 may generate, via the API 112, another search query for retrieving data related to the user name john.smith from the data collection database 134. The process of retrieving data related to a user name is the same as described above for retrieving data related to a user identification. All of the above description that applies to user identifications also applies to user names. Accordingly, for the sake of brevity, such description is not repeated.

Although an example of user identification is described above as including a user name and a domain name, the present disclosure is not limited to such an example, which is not to suggest that any other description herein is limiting. As noted above, the user identification may be various forms of identification used to identify a user account.

Locally Retrieving Data Associated with a User Identification to Prevent Account Takeover In some embodiments, the data that is populated within the database 132 (for example, data collection database 134) may be offloaded to the local database 142 (for example, local data collection database 144) and every time the data collection database 134 is populated with new data, such new data may be pushed to the local data collection database 144 so that the local data collection database 144 has up-to-date data. Accordingly, in some embodiments, the local server 152 may retrieve data (the same data described above as being retrieved by server 102) from the local database 142 (for example, local data collection database 144).

As noted above, the server 102 and database 132 may be associated with a third party that provides services relating to providing exposed data (for example, exposed passwords) associated with a user identification. The third party (for example, associated with the server 102 and database 132) may provide a service of providing data related to the user identification by retrieving data from a database 132 associated with the third party. This way, an individual or a company (for example, associated with the local server 152 and local database 142) that is looking to see if there are any exposed passwords associated with a user identification merely need to send a query identifying one or more user identifications, and the third party (for example, associated with the server 102 and database 132) performs the process of retrieving data associated with the user identification and sends the retrieved data to these individuals or companies. Alternatively, the third party may provide a service of providing all the data to the individuals or companies so that the individuals or companies themselves can perform the retrieving of data associated with a user identification. This portion of the disclosure is related to the latter, where the third party (for example, associated with the server 102 and database 132) provides a service of providing all the data to the individuals or companies (for example, associated with the local server 152 and local database 142) so that the individuals or companies themselves can perform retrieving of data (for example, via a local data collection database 144) associated with a user identification.

By having all the data (which is populated within the data collection database 134) within the local collection database 144, the local server 152 may be able to perform the retrieval of data associated with a user identification. Such local retrieval may be helpful when the local server 152 (or client device 104) requires bulk retrieval of data associated with a plurality of user identifications. Since the local database 142 is directly connected to the local server 152, the retrieval of bulk data from the local database 142 may be quicker and more efficient in terms of utilizing computing resources (compared to retrieval of bulk data by generating a query identifying a plurality of identifications and sending the query to the server 102 so as to receive the bulk data that is retrieved by the server 102). By retrieving bulk data at a time, an individual or a company can be proactive in preventing account takeover.

In some embodiments, the local server 152 may obtain a query identifying a user identification. The query may be obtained from a client device 104 (for example, an administrator) or may be generated by the local server 152 at a predetermined time. In view of the obtained query, data associated with a user identifications may be retrieved from the local database 142 (for example, local collection database 144). The retrieval process for retrieving data by the local server 152 from the local database 142 may be the same as the retrieval process described above for retrieving data by the server 102 from the database 132.

Further, in some embodiments, the other processes described above with regard to server 102 and database 132 may be the same with regard to local server 152 and local database 142. Specifically, the API 162 may perform the same operations performed by API 112, communication subsystem 164 may perform the same operations performed by communication subsystem 114, monitoring subsystem 166 may perform the same operations as monitoring subsystem 116, local data collection database 144 may store all the data populated within the data collection database 134, and the local miscellaneous database 146 may store similar data populated within the miscellaneous database 136.

Notification of Exposed Data to Prevent Account Takeover

As discussed above, server 102 or server 152 may retrieve, from a database (for example, data collection database 134 or local data collection database 144), data (for example one or more passwords) associated with one or more user identification entries in the database that matches a user identification (or a plurality of user identifications). In some embodiments, the retrieved data may include one or more passwords (for example, one or more plaintext passwords) associated with the user identification. The data may be retrieved in response to a user attempting to login (for example, via client device 104) using the user identification and password combination, may be retrieved in response to a request from an administrator (for example, client device 104), or may be retrieved at any time.

In some embodiments, when the data associated with the user identification is retrieved by the server 102, the server 102 may send the retrieved data to the local server 152 via network 150. Alternatively, in some embodiments, the data associated with the user identification may be retrieved by the local server 152. The data may include one or more passwords associated with the user identification, metadata (for example, a location of exposure, a number of exposures, or a data time of exposure) associated with the one or more passwords, or security questions and answers associated with a user account (which is associated with a user identification and password combination). Although the techniques below may be described to be performed by the local sever 152, it should be understood that such techniques can be performed by server 102.

Once the data is retrieved, the data (for example, one or more passwords) may be compared (for example, by monitoring subsystem 166) with a password associated with the user identification to determine if there is a match. For instance, a password that a user uses to login to access a user account (that is associated with the user identification) may be compared (for example, by monitoring subsystem 166) to the retrieved one or more passwords to determine if there is a match between the password associated with the user identification (which is associated with the user account) and the retrieved one or more passwords. The password associated with the user identification may be obtained by the local server 152 from the client device 104 when the user logs in to access the user account using the user identification and the password. Alternatively, in some embodiments, the password associated with the user identification may be obtained from the local database 142 (for example, the local miscellaneous database 146) that may store a list of user identification and password pairs associated with a plurality of user accounts. In some embodiments, the retrieved security questions and answers may also be compared to security questions and answers associated with a user account (which is associated with the user identification and password) to determine whether they match. The security questions and answers associated with one or more user accounts may stored in the local miscellaneous database 146 and the local server 152 may retrieve these security questions and answers associated with one or more user accounts in order to compare it with the retrieved security questions and answers.

In some embodiments, once the one or more passwords are retrieved by the local server 152, the local server 152 (for example, the monitoring subsystem 166) may determine whether one or more of the retrieved one or more passwords is a plaintext password or a non-plaintext password. In some embodiments, the local server 152 may determine whether the one or more of the retrieved one or more passwords matches the password associated with the user identification when (e.g., in response to an event in which) it is determined that the one or more of the retrieved one or more passwords is the plaintext password. In other words, in some embodiments, determining whether the retrieved one or more passwords matches a password associated with the user identification may include determining whether one or more of the retrieved one or more passwords is a plaintext password and determining whether the one or more of the retrieved one or more passwords matches the password associated with the user identification when it is determined that the one or more of the retrieved one or more passwords is a plaintext password.

In some embodiments, when it is determined that the one or more passwords is a non-plaintext password, the local server 152 may discard the non-plaintext password. In some embodiments, the monitoring subsystem 166 may crack the non-plaintext passwords with the techniques described above. The results of cracking the one or more non-plaintext passwords (utilizing rainbow tables, performing brute-force attacks, or performing dictionary attacks) may be compared to the password associated with the user account by the local server 152 (for example, the monitoring subsystem 166) to determine whether the result of the password cracking matches the password associated with the user account. Accordingly, in some embodiments, the local server 152 may determine whether the one or more passwords (plaintext, non-plaintext, or both) matches the password associated with the user identification associated with the user account.

In some embodiments, the local server 152 may determine whether the one or more passwords matches a password associated with the user identification based on a determination of whether a user account associated with the user identification is an active user account. The local server 152 may determine whether a user account associated with a user identification is an active user account or an account that is inactive. The server 152 (for example, monitoring subsystem 166) may determine this by comparing a time stamp of a previous login of the user account using the user identification and a current time. For example, the local miscellaneous database 146 may store a time stamp of a latest attempt to login to access a user account using the user credential, and the local server 152 may obtain the latest time stamp associated with the user credential to determine whether the user account (associated with the user credential) is an active user account. In some embodiments, the local server 152 may compare the time stamp of previous (or latest) access of the user account using the user credential and a current time and determine that the user account is an active user account when (e.g., in response to an event in which) a time difference between the current time and the time stamp of previous (or latest) access of the user account is less than a predetermine amount (for example, less than a few years, few months, or few days).

When it is determined that the time stamp of a previous (or latest) access of the user account is within a predetermined amount of time from the current time, the local server 152 may determine that the user account is an active user account. However, when it is determined that the time stamp of a previous (or latest) access of the user account is not within a predetermined amount of time from the current time, then the local server 152 may determine that the user account is an inactive user account. In some embodiments, when (e.g., in response to an event in which) it is determined that the user account is an active user account, the local server 152 may determine whether the retrieved one or more passwords matches the password associated with the user identification. In some embodiments, when (e.g., in response to an event in which) it is determined that the user account is an inactive account, the local server 152 may not take any further action, thereby preserving communication and processing resources of the local server 152.

In some embodiments, when (e.g., in response to an event in which) the retrieved one or more passwords does not match the password associated with the user identification, the local server 152 does not take any action and allows the user account to be accessed using the existing user identification and password combination. However, in some embodiments, when (e.g., in response to an event in which) it is determined that the retrieved one or more passwords matches the password associated with the user identification or the retrieved security questions and answers match the security questions and answers associated with the user account, the server 152 may determine to block access to the user account associated with the user identification and the password. For example, when (e.g., in response to an event in which) it is determined that the retrieved one or more passwords matches the password associated with the user identification or that the retrieved security questions and answers match the security questions and answers associated with the user account, a user attempting to access the user account using the user identification and password combination may be prevented from accessing the user account. By blocking access to the user account in response to determining that the password and user identification combination has been exposed or that the security questions and answers associated with the user account have been exposed, the present techniques are expected to help prevent account take over by malicious actors.

In some embodiments, a user may be currently accessing the user account when it is determined that the retrieved one or more passwords matches a password associated with the user identification or that the retrieved security questions and answers match the security questions and answers associated with the user account. In such an instance, the local server 152 may notify the user of the user account that the user account has been exposed, that the functionalities (certain essential functionalities of the user account) of the user account of the may be disabled within a predetermined amount of time, to reset the password for the user account immediately, or to change the security questions and answers associated with the user account. As noted above, certain functionalities of the account may be disabled by the local server 152, thereby, forcing the user of the user account to take immediate action in resetting the password of the user account or changing the security questions and answers. Further, in some embodiments, the local server 152 may also automatically log out the user from the user account after a certain period of time (for example, a certain period of time after it is determined that the retrieved one or more passwords matches a password associated with the user identification or the retrieved security questions and answers match the security questions and answers associated with the user account) if the user has not reset the password for the user account or changed the security questions and answers. After automatically logging the user out of the user account, the local server 152 may block access to the user account until the password of the user account has been reset or the security questions and answers associated with the user account have been changed.

In some embodiments, a user of the user account may not be currently accessing the user account when it is determined that the retrieved one or more passwords matches a password associated with the user identification or that the retrieved security questions and answers match the security questions and answers associated with the user account. In such an instance, the local server 152 may block access to the user account whenever the user of the user account attempts to access the user account and during the attempt to access the user account, the user of the user account may be notified to reset the password associated with the user account or change the security questions and answers associated with the user account.

In some embodiments, the user associated with the user account may be notified to reset the password associated with the user account or change the security questions and answers associated with the user account when (e.g., in response to an event in which) the retrieved one or more passwords matches the password associated with the user account (which is associated with the user identification) or the retrieved security questions and answers match the security questions and answers associated with the user account. Such a notification may be via email, text, phone call, or any form of communication to notify the user of the user account to reset the password associated with the user account or the change the security questions and answers associated with the user account to prevent account takeover. In some embodiments, the notification may sent to the user via a means different from the user identification (which is used to access the user account). For example, if the user identification john.smith@gmail.com is used to access a user account and the password associated with this user account matches the retrieved one or more passwords, then the local server 152 may notify the user of the potential breach of the user account to reset the password or to change the security questions and answers via a different user identification (for example, a different email associated with the user of the user account) or via a different means of communication (for example, text, phone call, etc.). The different user identification or information regarding a different means of communication may be stored within and obtained from the local miscellaneous database 146. By notifying a user of the user account via a different user identification or via a different means of communication, the present techniques are expected to avoid the possibility of a third party (for example, a criminal party) being able to reset the password or change the security questions and answers before the user of the user account is able to. Accordingly, some embodiments may notify the user of the user account that the password or security questions and answers have been exposed via a different user identification or via a different means of communication to prevent account takeover.

In some embodiments, the user associated with the user account may be notified to reset the password associated with the user account or to change the security questions and answers associated with the user account when (e.g., in response to an event in which) the retrieved one or more passwords matches the password associated with the user account or the retrieved security questions and answers match the security questions and answers associated with the user account. As noted above, the notification may be via email, text, phone call, or any form of communication to notify the user of the user account to reset the password associated with the user account or to change the security questions and answers associated with the user account to prevent account takeover.

In some embodiments, the local server 152 may notify the user (for example, via client device 104) of the user account that the password associated with the user account has been exposed and that the user needs to immediately reset the password in order to access the user account or may notify the user (for example, via client device 104) of the user account that the security questions and answers associated with the user account have been exposed and that the user needs to immediately change the security questions and answers associated with the user account. In some embodiments, in addition to notifying the user of the user account of that the password associated with the user account has been exposed or that the security questions and answers associated with the user account have been exposed, the local server 152 may also notify metadata associated with the one or more passwords that matches the password associated with the user account or metadata associated with the retrieved security questions and answers that match the security questions and answers associated with the user account.

The metadata may include a number of exposures associated with the one or more passwords or with the security questions and answers, a date and time of exposure of the each of the number of times the password has been exposed or the security questions and answers have been exposed, or a location of exposure of the one or more passwords or the security questions and answers. In some embodiments, the user of the user account may be provided with additional details regarding the exposed password or the security questions and answers. For instance, the user may be notified of a number of times the password associated with the user account has been exposed or the security questions and answers associated with the user account have been exposed, a date and time of exposure of each of the number of times the password has been exposed or the security questions and answers have been exposed, or a location (or locations) of exposure of the password or exposure of the security questions and answers. The date and time of exposure of the password or the security questions and answers may provide the user with valuable information. The date and time of the exposure may allow the user to remember the user's previous use of the user account on a particular day and time, which may help the user determine the cause of exposure of the password (and the user identification) associated with the user account or the cause of the exposure of the security questions and answers associated with the user account, thereby helping prevent the user from exposing the user credentials in a similar fashion.

The local server 152 may also keep a record (for example, in the local miscellaneous database 146) of a number of notifications that are sent to a user of a user account to reset passwords associated with the user account or to change the security questions and answers associated with the user account. In other words, in some embodiments, the local server 152 may require the user of the user account to reset the password associated with the user account many times or change the security questions and answers many times, and the number of times the local server 152 has required the user of the user account to reset the passwords (for example, different passwords) or change the security questions and answers (for example, different security questions and answers) may be recorded in the local miscellaneous database 146. In some embodiments, when (e.g., in response to an event in which) the user of the user account has been required to reset the passwords associated with the user account or to change the security questions and answers a predetermined number of times, then the local server 152 may classify such a user account as a high-risk user account (or the user as a high-risk user). In some embodiments, if the user account has been classified as a high-risk user account, then the user of the user account may be required to perform a two-factor authentication prior to being granted access to the user account. In other words, the user of the user account may now need to provide a password and another form of authentication in order to be able to access the user account. In some embodiments, if the user account has been classified as a high-risk user account, then the user may be required to change one or more of the user identification, the password, and the security questions and answers associated with the user account in order to access the user account.

In some embodiments, once the user is notified to reset the password associated with the user account or to change the security questions and answers associated with the user account, the user may be presented by embodiments with the opportunity to reset the password or change the security questions and answers. In some embodiments, the user of the user account may be provided with a set amount of time to complete the process of resetting the password associated with the user account or changing the security questions and answers associated with user account. If the user of the user account fails to reset the password or change the security questions and answers within the set amount of time, the user may need to provide additional information (other personally identifiable information) to verify the user's identity in order to be able to reset the password associated with the user account or to change the security questions and answers associated with the user account. Once the user of the user account resets the password associated with the user account or changes the security questions and answers associated with the user account, the user of the user account may be granted access to the user account. Accordingly, by granting access to a user account only after the password associated with the user account has been reset or after the security questions and answers associated with the user account have been changed, the present techniques are expected to help prevent account take over by malicious actors.

Figure 4:
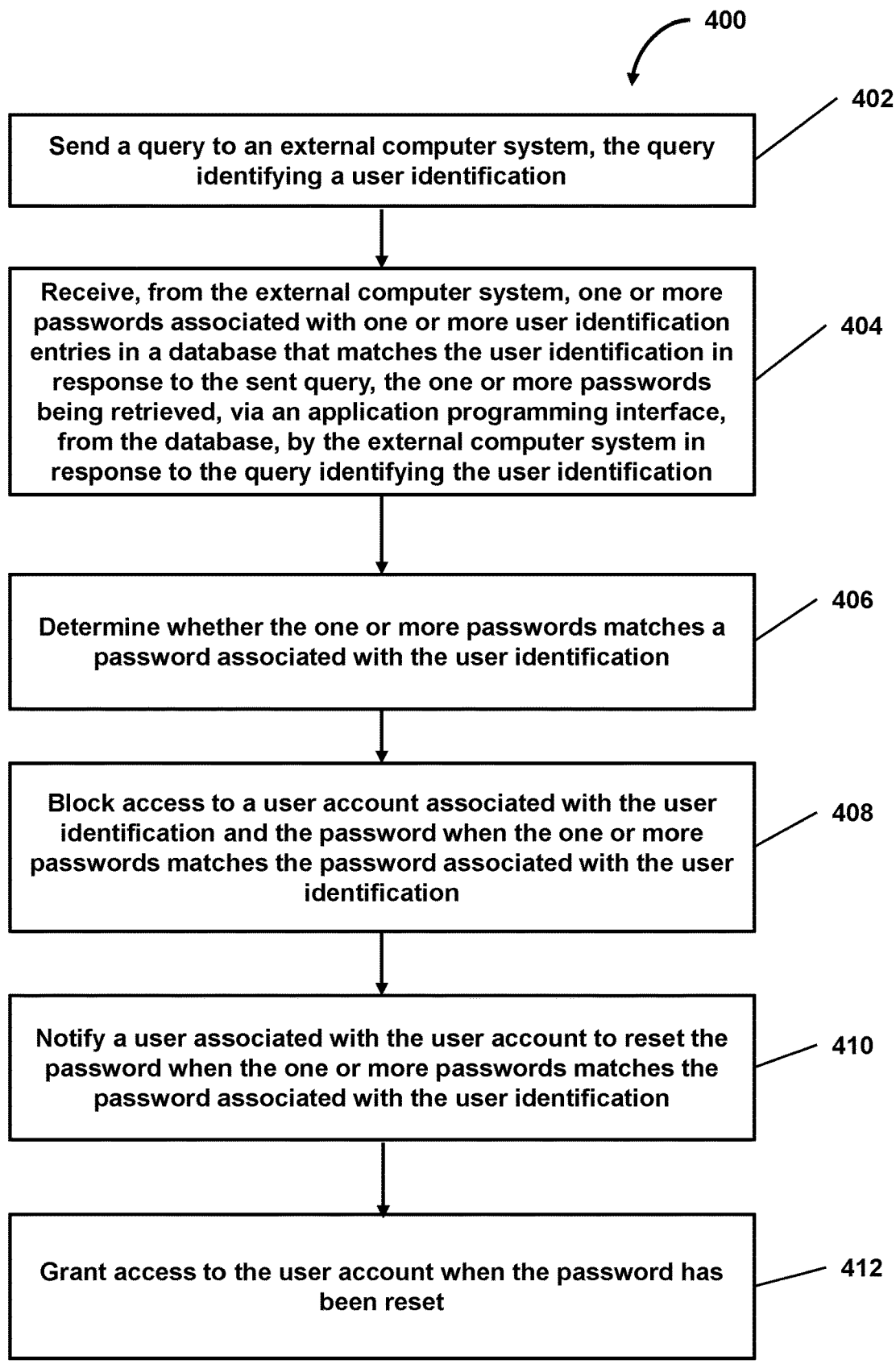
FIG. 4 is a flowchart of an example process that facilitates prevention of account takeover by receiving data associated with a user identification from an external computer system.

FIG. 4 illustrates an example process 400 that impedes account takeover by receiving data associated with a user identification from an external computer system. In step 402, a query identifying a user identification may be sent to an external computer system. In addition to identification, the query may also identify other information related to the user identification and a user, for example, location of access by the user (e.g., IP address) and date and time of access by the user. In response to the query, the external communication system may retrieve, via an application programming interface, from a database, data (for example, one or more passwords) associated with one or more user identification entries in the database that matches the user identification, and the data (for example, the one or more passwords) may be received from the external communication system (see step 404 in FIG. 4). The retrieved data may also include metadata associated with the one or more passwords. For example, the retrieved data may include a number of exposures associated with the one or more passwords, a date and time of exposure of the each of the number of times the password has been exposed, or a location of exposure of the one or more passwords. All of the retrieved data may be received from the external computer system. The process of retrieving the one or more passwords from the database is described above and below with respect to FIG. 6. Accordingly, for the sake of brevity, the process of retrieving the one or more passwords is not repeated.

In step 406, in some embodiments, the one or more passwords may be compared to a password associated with the user identification and it may be determined whether the one or more password matches the password associated with the user identification. In some cases, a password that a user uses to login to access a user account may be compared to the one or more passwords to determine if there is a match between the password associated with the user identification (which is associated with the user account) and the one or more passwords. The determination in step 406 may further include determining whether a user account is an active user account (which is described in more detail above and with regard to FIGS. 9 and 10) and determining whether the retrieved one or more passwords is a plaintext or non-plaintext password (which is described in more detail above and with regard to FIG. 11).

In step 408, in some embodiments, when the one or more passwords matches the password associated with the user identification, access to a user account associated with the user identification and password combination may be blocked. For example, when it is determined that the one or more passwords matches the password associated with the user identification, a user attempting to access the user account using the user identification and password (which matches one or more of the one or more passwords) combination may be prevented (blocked) from accessing the user account. By blocking access to the user account when it is determined that the password and user identification combination has been exposed, the present techniques help prevent account take over by third parties, thereby preventing financial losses and losses relating to confidential information.

In step 410, in some embodiments, a user associated with the user account may be notified to reset the password when the one or more passwords matches the password associated with the user identification. Such a notification may be via email, text, phone call, or any form of communication to notify the user of the user account to reset the password associated with the user account to prevent account takeover. In some embodiments, the user of the user account may also be notified to change the security questions and answers associated with the user account when the received security questions and answers match the security questions and answers associated with the user account. In some embodiments, the notification may be via a means different from the user identification (which is used to access the user account). For example, if the user identification john.smith@gmail.com is used to access a user account and the password associated with this user account matches the one or more passwords, then the user may be notified of the potential breach of the user account to reset the password via a different user identification (for example, a different email associated with the user of the user account) or via a different means of communication (for example, text, phone call, etc.). By notifying a user of the user account via a different user identification or via a different means of communication, the present techniques avoid the possibility of a third party (for example, a criminal party) being able to reset the password or change the security questions and answers before the user of the user account is able to. Accordingly, embodiments may notify the user of the user account that the password or security questions and answers have been exposed via a different user identification or via a different means of communication to prevent account takeover.

In addition to requesting and notifying the user to reset the password associated with the user account and that the password (and user identification) associated with the user account has been exposed, the user may also be notified of metadata associated with the one or more passwords that matches the password associated with the user account. The metadata may include a number of exposures associated with the one or more passwords, a date and time of exposure of the each of the number of times the password has been exposed, or a location of exposure of the one or more passwords. In other words, in some embodiments, the user of the user account may be provided with additional details regarding the exposed password. For instance, the user may be notified of a number of times the password associated with the user account has been exposed, a date and time of exposure of the each of the number of times the password has been exposed, or a location (or locations) of exposure of the password. The data and time of exposure of the password may provide the user with valuable information. The date and time of the exposure may allow the user to recollect the user's previous use of the user account on a particular day and time, which may help the user determine the cause of exposure of the password and user identification associated with the user account.

In step 412, the user of the user account may be granted access to the user account when the password has been reset. In other words, once the user is notified to reset the password associated with the user account, the user has the opportunity to reset the password. In some embodiments, the user of the user account may be provided with a set amount of time to complete the process of resetting the password associated with the user account. If the user of the user account fails to reset the password within the set amount of time, the user may need to provide additional information (other personally identifiable information) to verify the user's identity in order to be able to reset the password associated with the user account. Once the user of the user account resets the password associated with the user account, the user of the user account may be granted access to the user account. Accordingly, by granting access to a user account only after the password associated with the user account has been reset, the present techniques are expected help prevent account take over by malicious actors.

Figure 5:
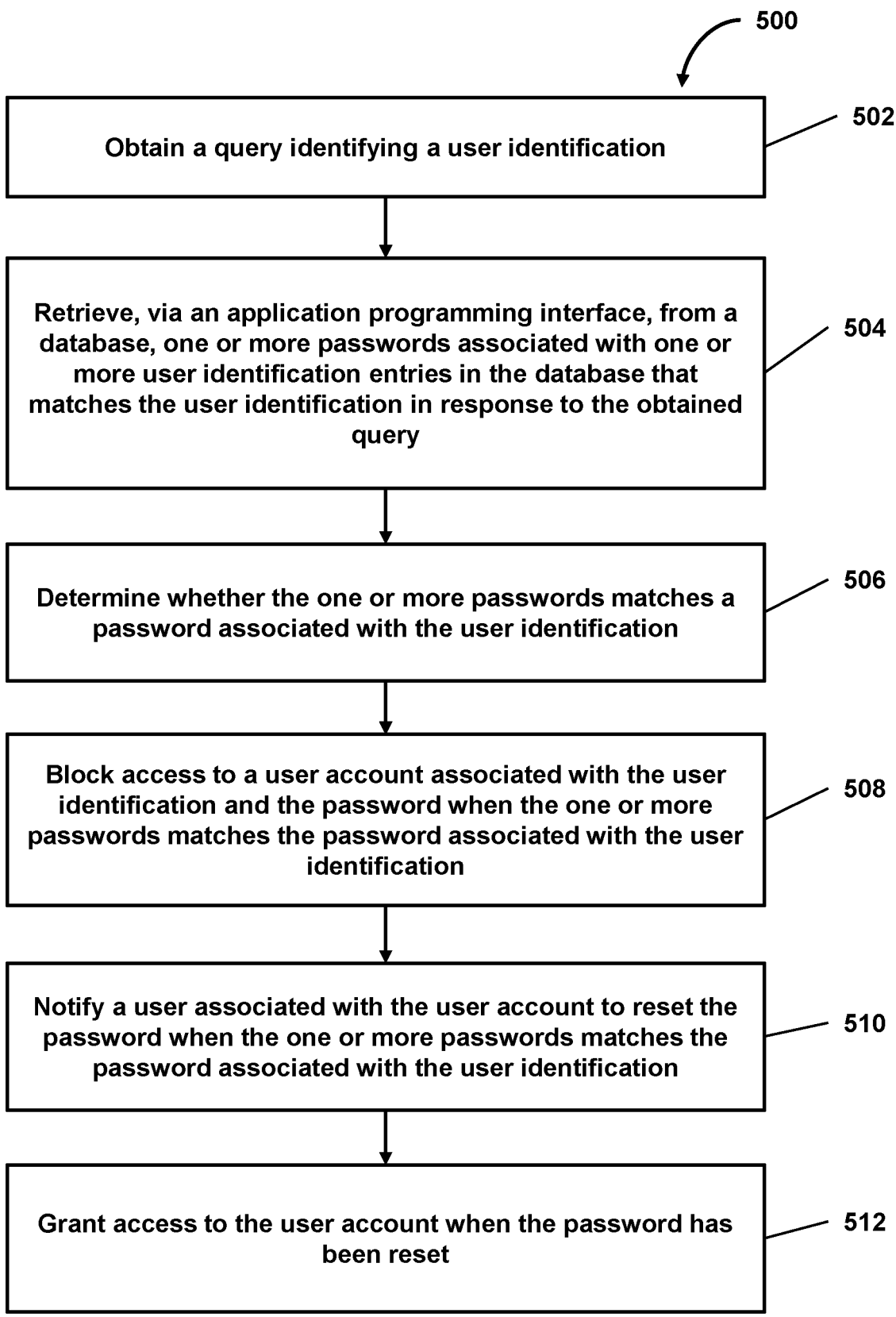
FIG. 5 is a flowchart of an example process that facilitates prevention of account takeover by locally retrieving data associated with a user identification.

FIG. 5 illustrates an example process 500 that impedes account takeover by locally retrieving data associated with a user identification. In step 502, a query identifying a user identification may be obtained. In response to the obtained query, data (for example, one or more passwords) associated with one or more user identification entries in a database that matches the user identification may be retrieved, via an application programming interface, from a database (see step 504 in FIG. 5). The retrieved data may also include metadata associated with the one or more passwords. For example, the retrieved data may include a number of exposures associated with the one or more passwords, a date and time of exposure of the each of the number of times the password has been exposed, or a location of exposure of the one or more passwords. The process of retrieving the one or more passwords from the database is described above and below with respect to FIG. 6. Further, the steps 506-512 in FIG. 5 are the same as steps 406-412 in FIG. 4.

Figure 6:
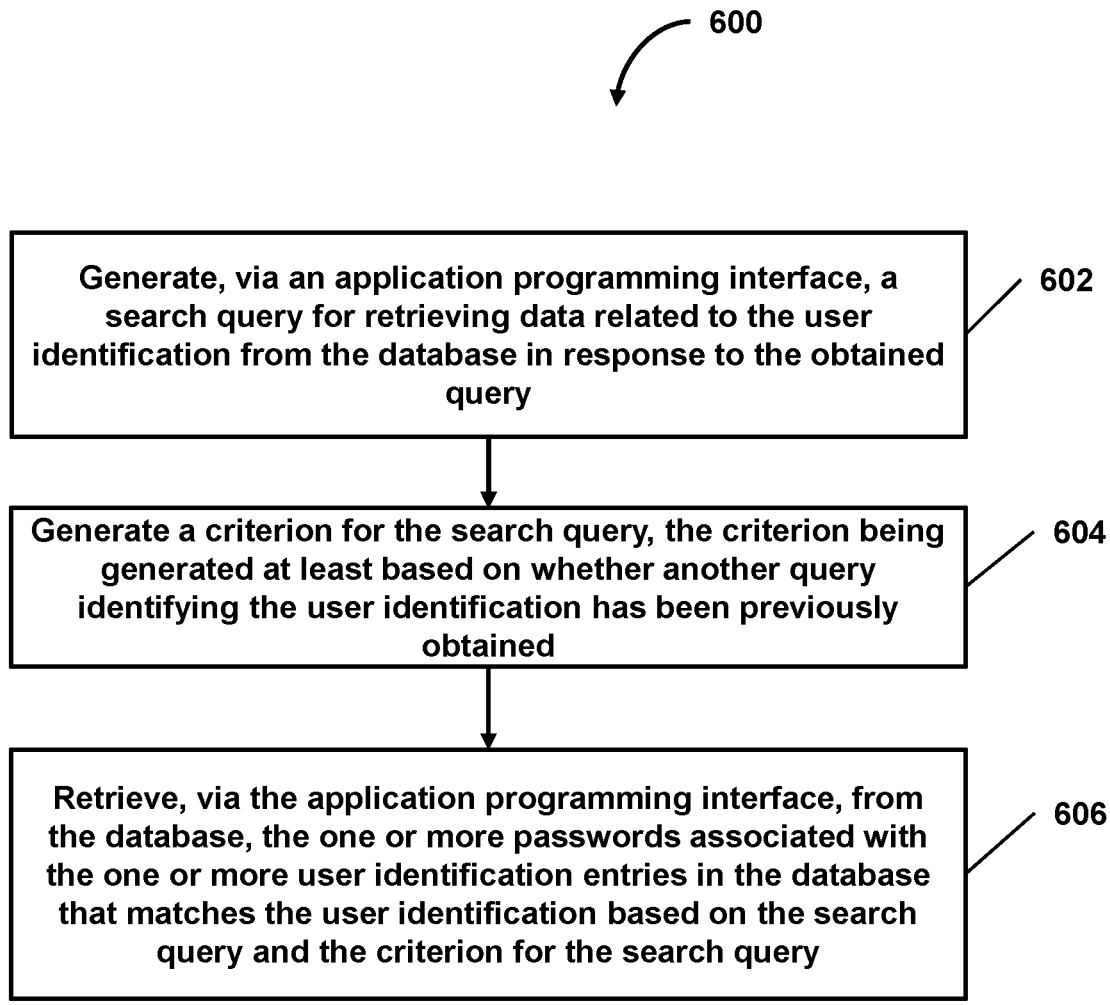
FIG. 6 is a flowchart of an example process that facilitates retrieval of data.

FIG. 6 illustrates an example process 600 that retrieves passwords that have been exposed. In step 602, in response to the obtained query, a search query may be generated, via an application programming interface, for retrieving data related to the user identification (which is identified in the query) from a database. Further, in step 604, a criterion for the search query may be generated. The criterion for the search query may be generated at least based on whether another query identifying the user identification has been previously obtained. For example, a determination may be made whether the user identification (that is received in the current query) has also been previously obtained in one or more previous queries. Details regarding the generation of the criterion for the search query based on whether another query identifying the user identification has been previously obtained is described with regard to FIG. 7.

In step 606, in some embodiments, one or more passwords associated with one or more user identification entries in the database that matches the user identification are retrieved, via the application programming interface, from the database, based on the search query and the criterion for the search query. In response to determining that the user identification has been previously obtained in another query, the search for data related (for example, one or more exposed passwords related to the user identification) to the user identification from the database may be limited to, for example, data that has been populated on or after the date (or time) the user identification was previously obtained in the other query. In other words, when it is determined that another query identifying the same user identification (which was identified in the current query) has been previously obtained, a search criterion is generated such that data (for example, one or more passwords related to the user identification) is retrieved from a subset of the database that was populated with data on or after the date or time of the previously obtained query. This makes the data retrieval process more efficient. Searching a portion of a database decreases the time taken to retrieve data associated with the user identification, reduces the use of computer resources and provides the retrieved data to a recipient sooner so that the recipient may act on the such data in a quicker manner.

Figure 7:
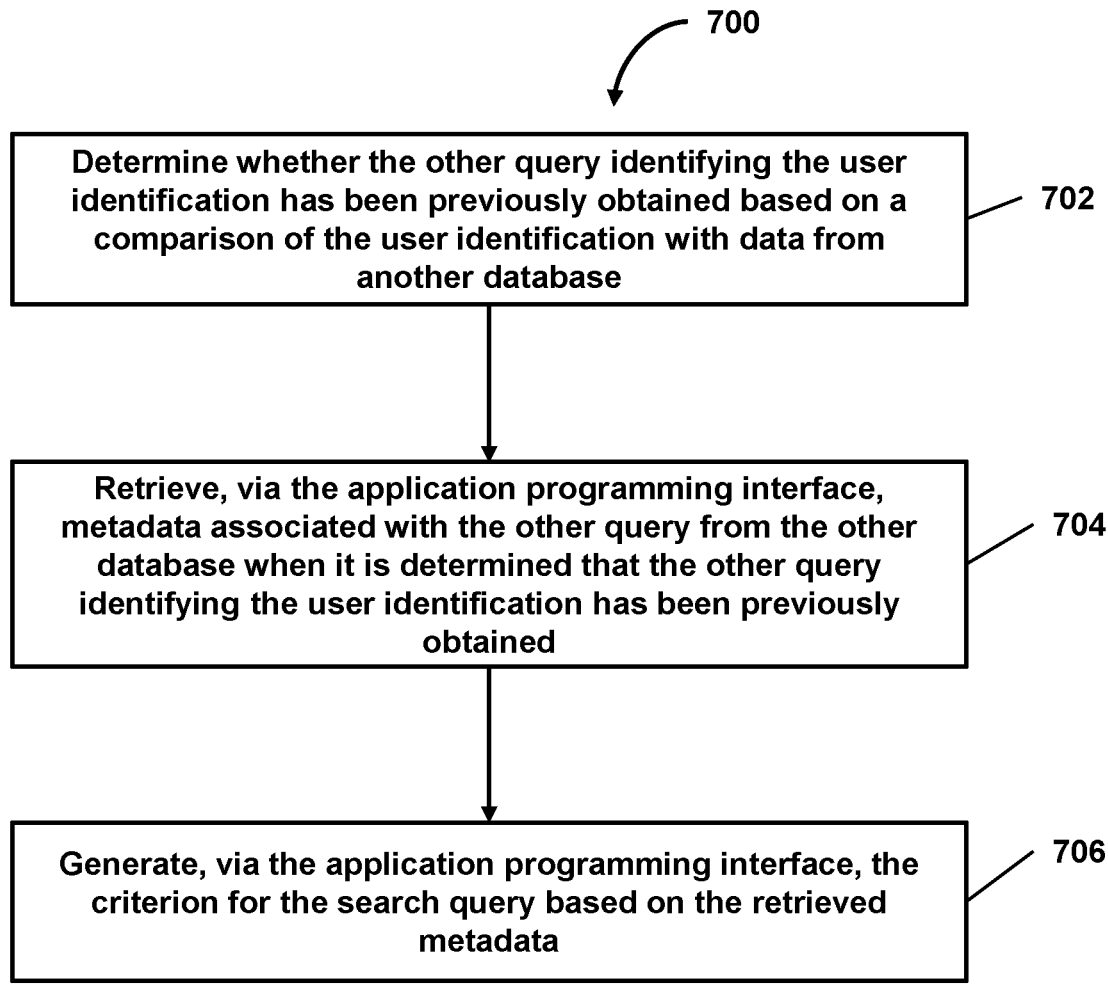
FIG. 7 is a flowchart of an example process that facilitates the generation of a criterion for a search query.

FIG. 7 illustrates an example process 700 that generates a criterion for a search query. In step 702, in some embodiments, it is determined whether another query identifying the user identification has been previously obtained based on a comparison of the user identification with data from another database. Whenever a query identifying a user identification is obtained, a record (for example, metadata related to the query) of such a query may be kept in a database. Such a record may include a date and time of the obtained query, a location (for example, IP address) from where the query is received, a user identification identified in the obtained query, or any other data related to the user identification. Based on such a record, it may be determined whether another query identifying the user identification has been previously obtained based on a comparison of the user identification with data from that database.

In step 704, in some embodiments, metadata associated with the other query is retrieved from a database when it is determined that the other query identifying the user identification has been previously obtained. The metadata associated with the other query may include at least one of a time or date at which the other query identifying the user identification was obtained. In step 706, the criterion for the search query may be generated based on the retrieved metadata. In some cases, the criterion for the search query may be generated based on at least one of a time or date at which the other query identifying the user identification was previously obtained.

Figure 8:
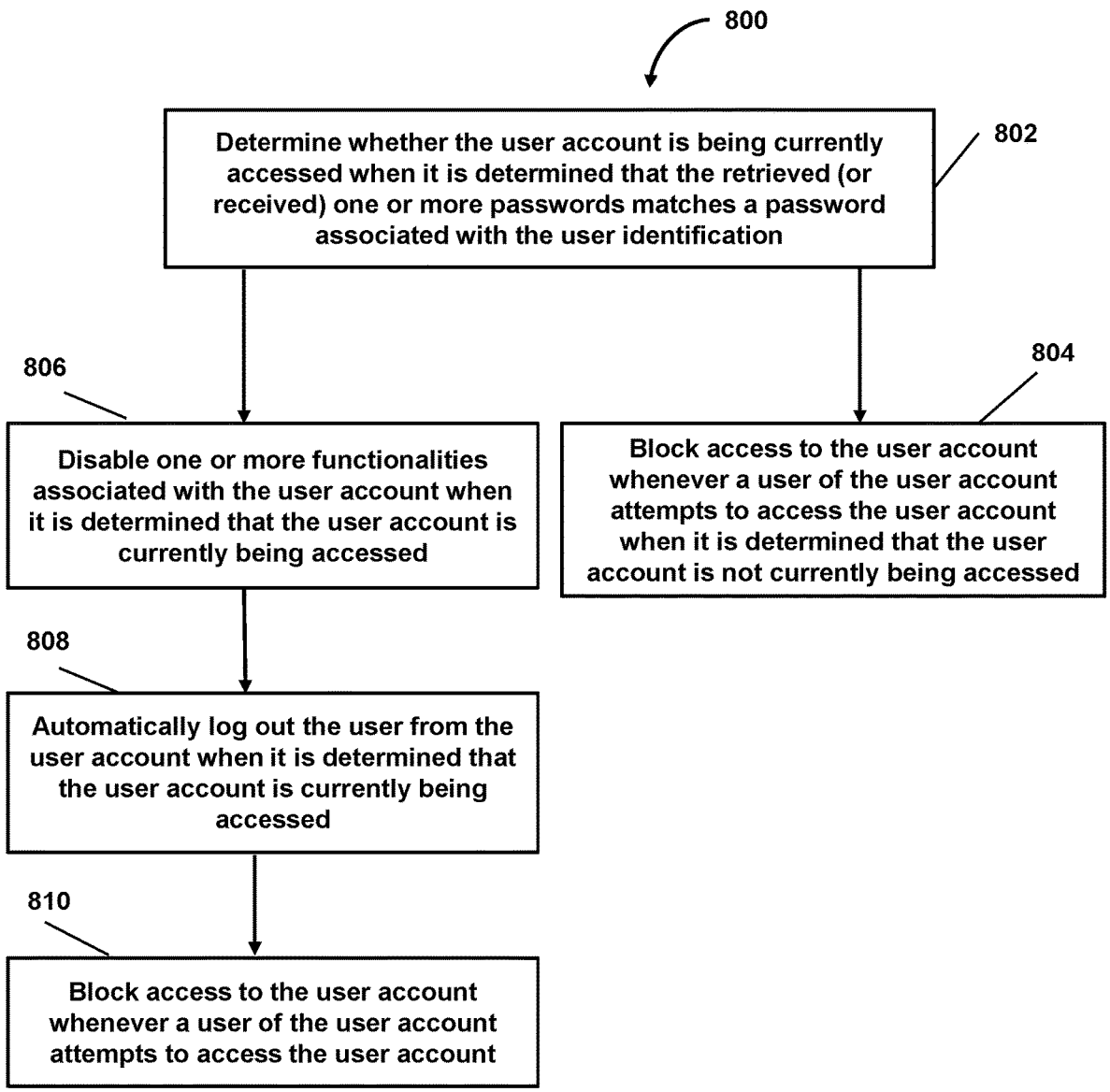
FIG. 8 is a flowchart of an example of process that facilitates blocking access to a user account.

FIG. 8 illustrates an example process 800 that blocks access to a user account. In step 802, a determination may be made as to whether the user account is being currently accessed when it is determined that the retrieved one or more passwords matches a password associated with the user identification. When it is determined that the user account is not currently being accessed, a user may be blocked from accessing the user account whenever the user of the user account attempts to access the user account in step 804. In some embodiments, in addition to blocking access to the user account when the user attempts to access the user account, the user of the user account may also be notified to reset the password associated with the user account when the user attempts to access the user account.

However, when it is determined that the user account is currently being accessed, one or more functionalities of the user account may be disabled in step 806. Disabling one or more functionalities of the user account may force the user of the user account to take immediate action in resetting the password of the user account. Additionally, or alternatively, the user account may be forced to log out automatically when it is determined that the user account is currently being accessed in step 808. In some embodiments, the user of the user account may be automatically logged out from the user account after a certain period of time (for example, a certain period of time after it is determined that the retrieved one or more passwords matches a password associated with the user identification) if the user has not reset the password for the user account within the certain amount of time. In step 810, a user may be blocked from accessing the user account whenever the user of the user account attempts to access the user account.

Figure 9:
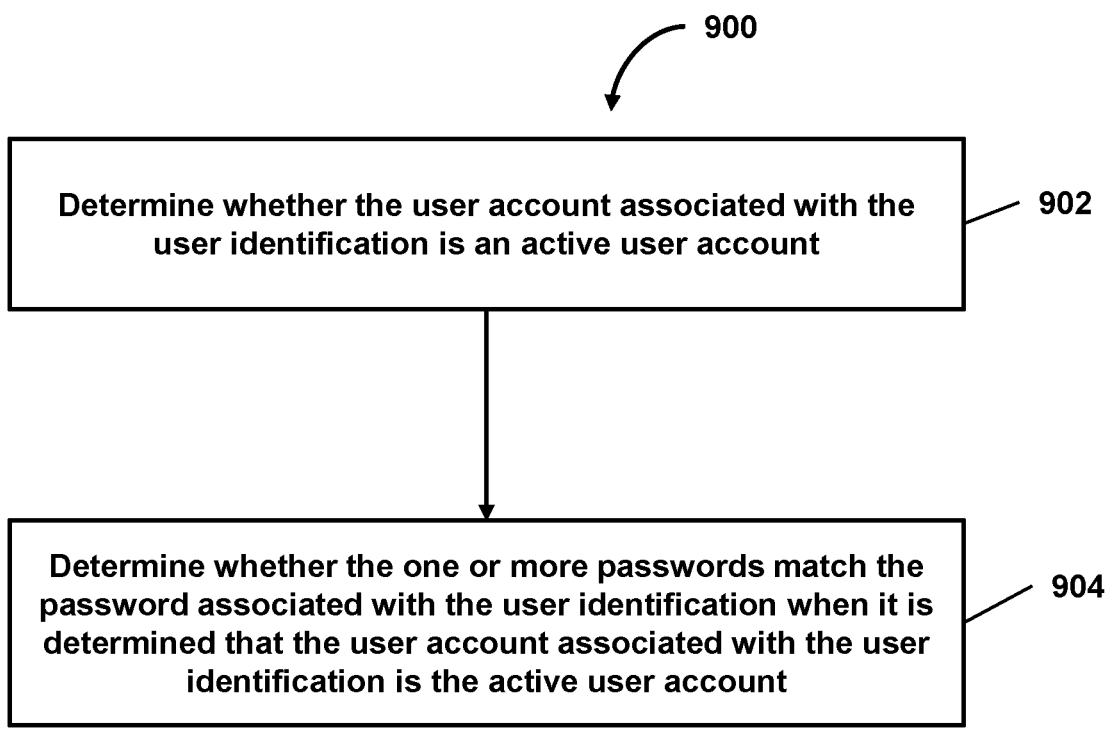
FIG. 9 is a flowchart of an example process that facilitates determining whether one or more retrieved (or received) passwords match a password associated with a user identification.

FIG. 9 illustrates an example process 900 that determines whether one or more retrieved (or received) passwords match a password associated with a user identification. In order to determine whether the retrieved (or received) one or more passwords matches a password associated with the user identification, a determination may be made as to whether the user account associated with the user identification is an active user account in step 902. Details regarding the techniques to determine whether the user account associated with the user identification is an active user account is discussed above and below with regard to FIG. 10. In step 904, when it is it is determined that the user account associated with the user identification is an active user account, a determination may be made as to whether the one or more passwords match the password associated with the user identification. However, when it is it is determined that the user account associated with the user identification is an inactive user account, then no further action is taken, thereby preserving communication and processing resources, in some embodiments.

Figure 10:
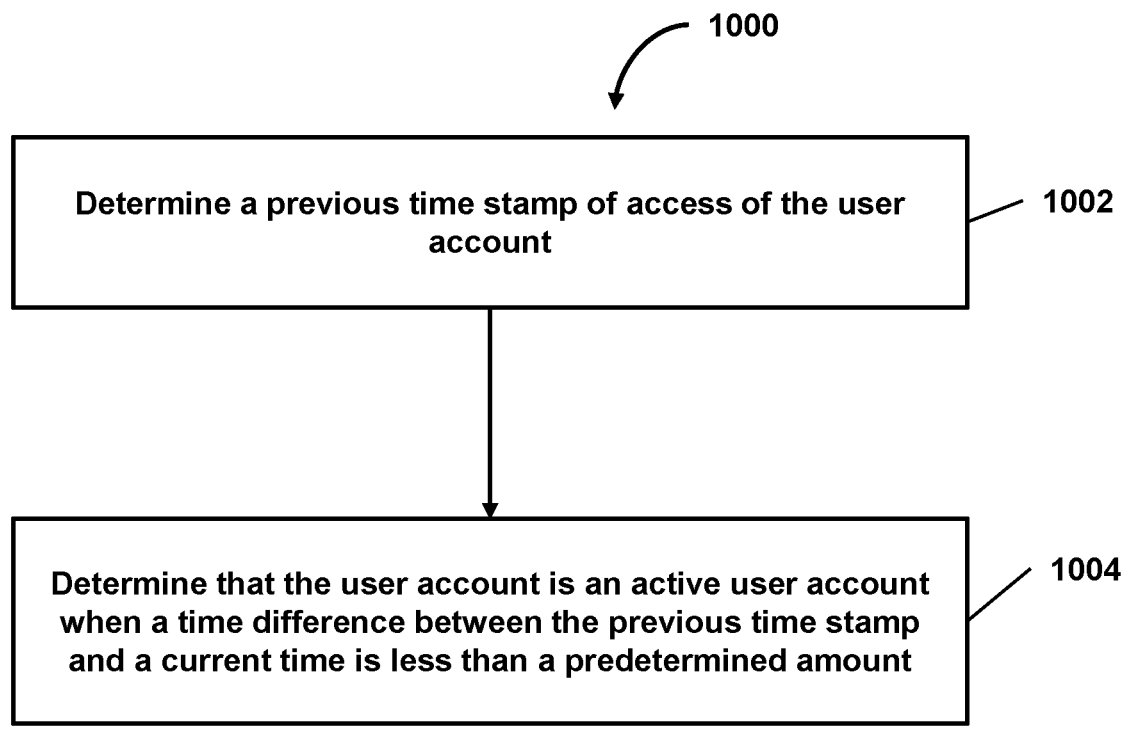
FIG. 10 is a flowchart of an example process that facilitates determining whether a user account associated with a user identification is an active user account.

FIG. 10 illustrates an example process 1000 that determines whether a user account associated with a user identification is an active user account. In step 1002, a previous (or latest) time stamp of access of the user account may be determined. In some embodiments, a time stamp of a previous (or latest) attempt to login to access a user account using the user credential may be stored in a database and this time stamp may be obtained from the database. In step 1004, the previous time stamp of access of the user account may be compared with a current time in order to determine whether the user account is an active user account. When a time difference between the previous time stamp and a current time is less than a predetermined amount, then in step 1004, it may be determined that the user account is an active user account. However, when a time difference between the previous time stamp and a current time is equal to or greater than a predetermined amount, it may be determined that the user account is an inactive user account.

Figure 11:
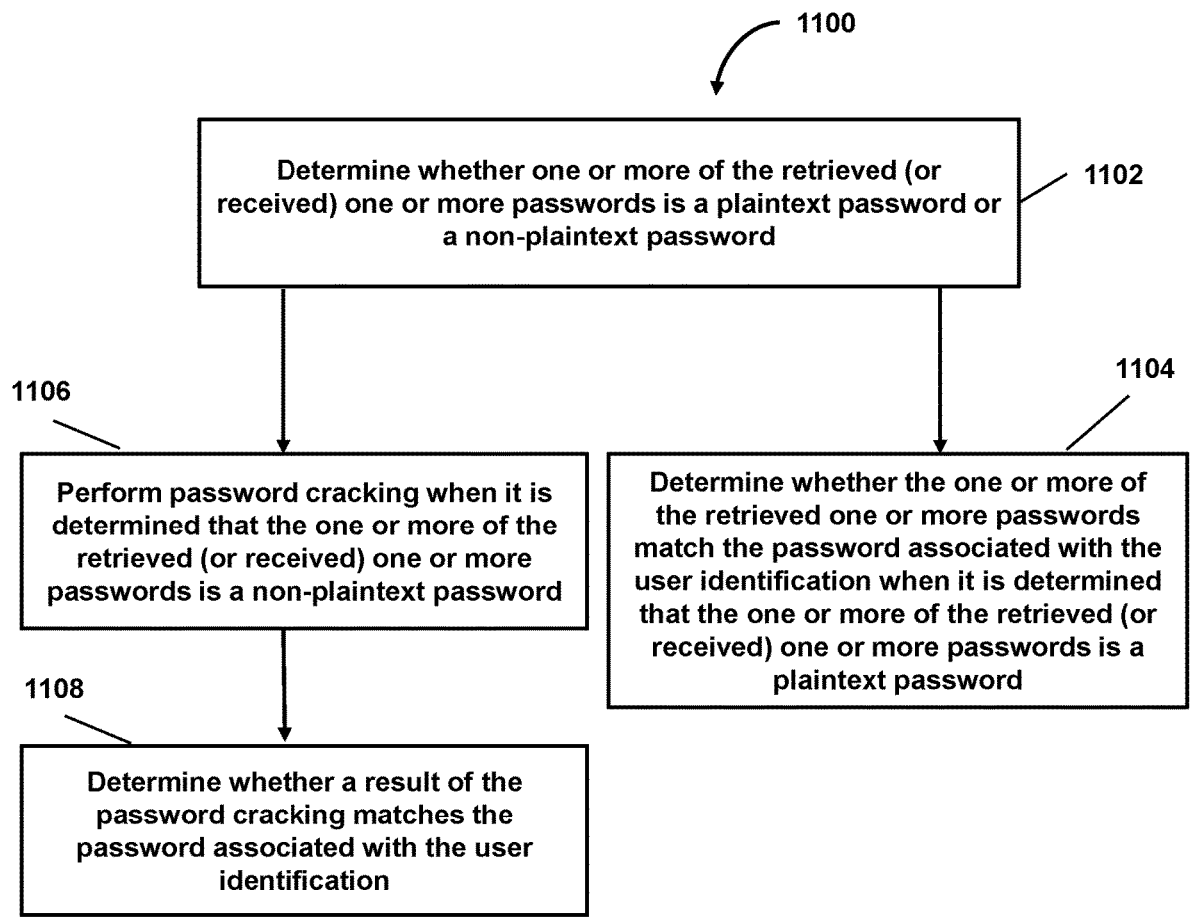
FIG. 11 is a flowchart of an example process that facilitates determining whether one or more retrieved (or received) passwords match a password associated with a user identification.

FIG. 11 illustrates an example process 1100 that determines whether one or more retrieved (or received) passwords match a password associated with a user identification. In step 1102, a determination may be made as to whether one or more of the retrieved (or received) one or more passwords are a plaintext password (unencrypted password) or a non-plaintext password (encrypted password). A determination, in step 1104, may be made as to whether the one or more of the retrieved (or received) one or more passwords match the password associated with the user identification when it is determined that the one or more of the retrieved (or received) one or more passwords is a plaintext password.

On the other hand, when it is determined that one or more of the retrieved (or received) one or more passwords is a non-plaintext password in step 1102, password cracking may be performed in step 1106, e.g., with the above-described techniques. In step 1108, the results of cracking the one or more non-plaintext passwords (utilizing rainbow tables, performing brute-force attacks, or performing dictionary attacks) may be compared to the password associated with the user account to determine whether the result of the password cracking matches the password associated with the user account.

Figure 12:
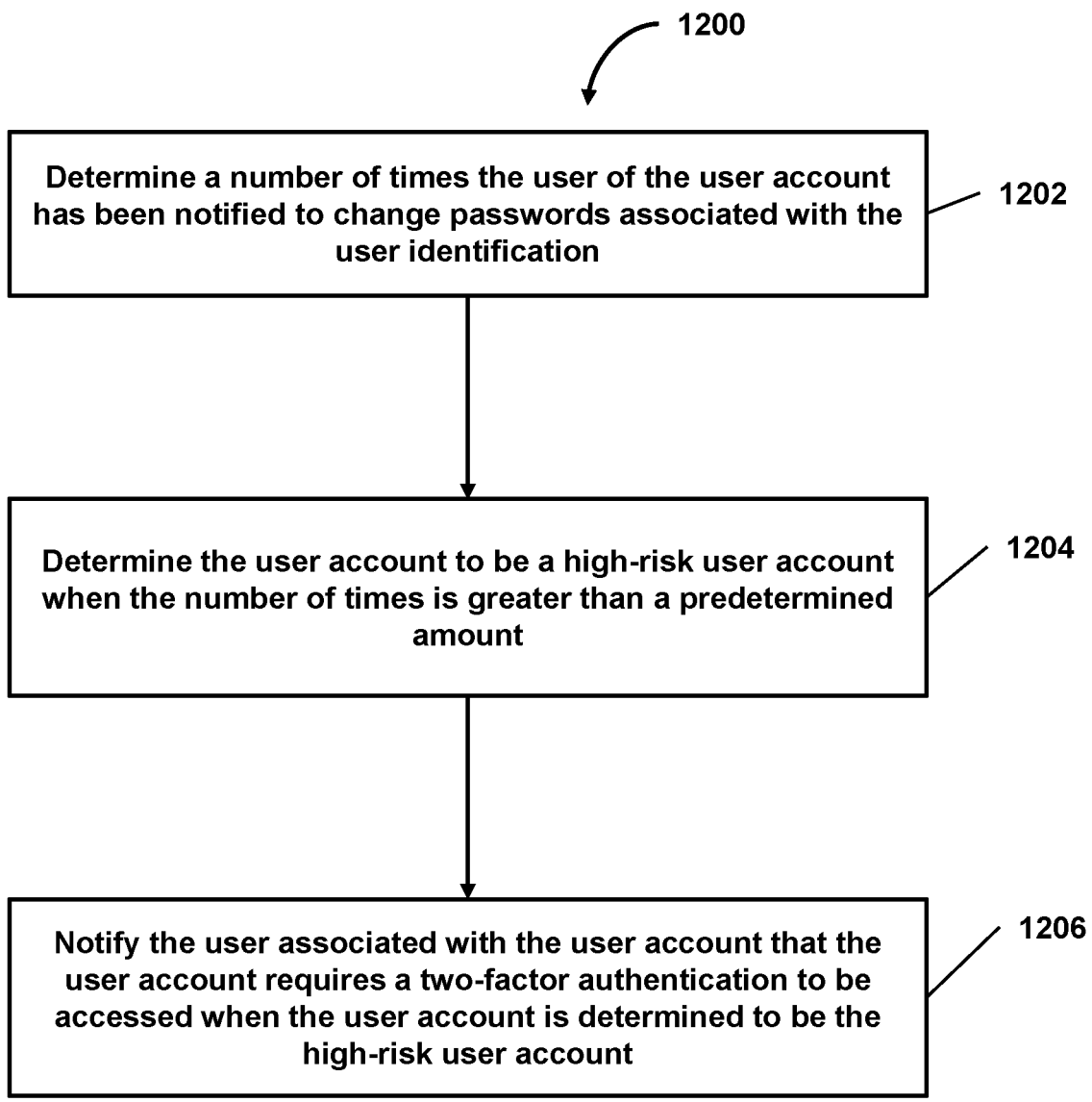
FIG. 12 is a flowchart of an example process that facilitates a determination of a high-risk user account.

FIG. 12 illustrates an example process 1200 that classifies a high-risk user account. In step 1202, a number of times a user of the user account has been notified to change passwords associated with the user identification may be determined. In step 1204, when the user of the user account has been notified to reset the passwords associated with the user account greater than a predetermined number of times, then the user account may be determined to be a high-risk user account (or the user may be determined to be a high-risk user). In step 1206 a user associated with the user account may be notified that the user account requires a two-factor authentication when the user account is determined to be a high-risk user account. That is, if the user account has been classified as a high-risk user account, then the user of the user account may be required to perform a two-factor authentication prior to being granted access to the user account. In some cases, the user of the user account may now need to provide a password and another form of authentication in order to be able to access the user account.

The present patent filing is one of a set of four filed on the same day by the same applicant and members of the set have the following titles: DETECTING USE OF COMPROMISED SECURITY CREDENTIALS IN PRIVATE ENTERPRISE NETWORKS; DETERMINING THE INTERSECTION OF A SET OF COMPROMISED CREDENTIALS WITH A SET OF ACTIVE CREDENTIALS WITH DATA STRUCTURES AND ARCHITECTURES THAT EXPEDITE COMPARISONS; FILTERING PASSWORDS BASED ON A PLURALITY OF CRITERIA; DETECTING USE OF PASSWORDS THAT APPEAR IN A REPOSITORY OF BREACHED CREDENTIALS. The entire content of each of the patent filings other than this one is hereby incorporated by reference.

Figure 13:
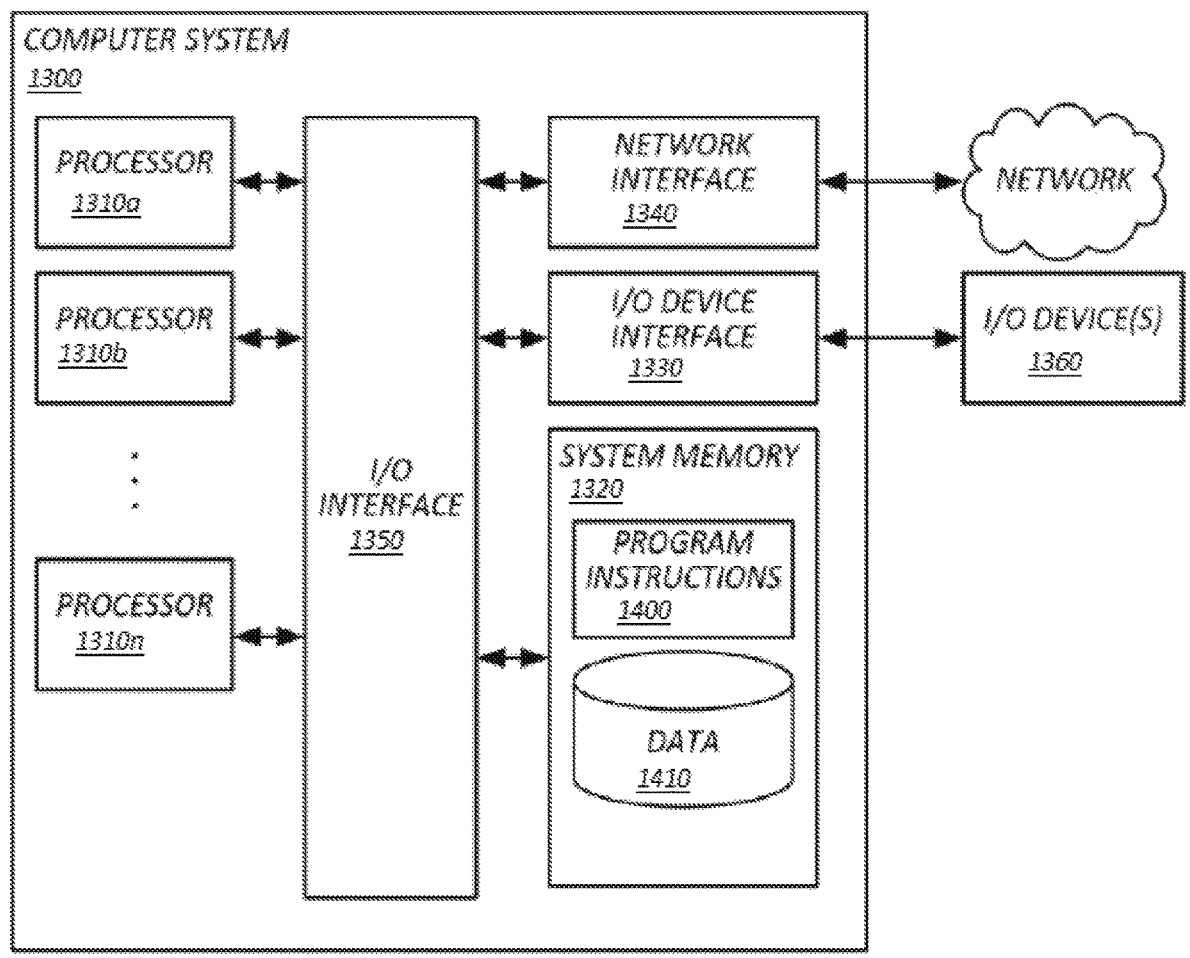
FIG. 13 is an example of a computing device by which the above techniques may be implemented.

FIG. 13 is a diagram that illustrates an exemplary computing device 1300 in accordance with embodiments of the present technique. Various portions of systems and methods described herein, may include or be executed on one or more computer systems similar to computing device 1300. Further, processes and modules described herein may be executed by one or more processing systems similar to that of computing device 1300.

Computing device 1300 may include one or more processors (e.g., processors 1310a-1310n) coupled to system memory 1320, an input/output I/O device interface 1330, and a network interface 1340 via an input/output (I/O) interface 1350. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing device 1300. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1320). Computing device 1300 may be a uni-processor system including one processor (e.g., processor 1310a), or a multi-processor system including any number of suitable processors (e.g., 1310a-1310n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing device 1300 may include a plurality of computing devices (e.g., distributed computer systems) to implement various processing functions.

I/O device interface 1330 may provide an interface for connection of one or more I/O devices 1360 to computing device 1300. I/O devices may include devices that receive input (e.g., from a user) or output information (e.g., to a user). I/O devices 1360 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1360 may be connected to computing device 1300 through a wired or wireless connection. I/O devices 1360 may be connected to computing device 1300 from a remote location. I/O devices 1360 located on remote computer system, for example, may be connected to computing device 1300 via a network and network interface 1340.

Network interface 1340 may include a network adapter that provides for connection of computing device 1300 to a network. Network interface 1340 may facilitate data exchange between computing device 1300 and other devices connected to the network. Network interface 1340 may support wired or wireless communication. The network may include an electronic communication network, such as the Internet, a local area network (LAN), a wide area network (WAN), a cellular communications network, or the like.

System memory 1320 may be configured to store program instructions 1400 or data 1410. Program instructions 1400 may be executable by a processor (e.g., one or more of processors 1310a-1310n) to implement one or more embodiments of the present techniques. Instructions 1400 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1320 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1320 may include a non-transitory computer readable storage medium that may have program instructions stored thereon that are executable by a computer processor (e.g., one or more of processors 1310a-1310n) to cause the subject matter and the functional operations described herein. A memory (e.g., system memory 1320) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1350 may be configured to coordinate I/O traffic between processors 1310a-1310n, system memory 1320, network interface 1340, I/O devices 1360, and/or other peripheral devices. I/O interface 1350 may perform protocol, timing, or other data transformations to convert data signals from one component (e.g., system memory 1320) into a format suitable for use by another component (e.g., processors 1310a-1310n). I/O interface 1350 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing device 1300 or multiple computing device 1300 configured to host different portions or instances of embodiments. Multiple computing devices 1300 may provide for parallel or sequential processing/execution of one or more portions of the techniques described herein.

Those skilled in the art will appreciate that computing device 1300 is merely illustrative and is not intended to limit the scope of the techniques described herein. Computing device 1300 may include any combination of devices or software that may perform or otherwise provide for the performance of the techniques described herein. For example, computing device 1300 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing device 1300 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing device 1300 may be transmitted to computing device 1300 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with one or more processors, a query identifying a user identification; retrieving, with one or more processors, via an application programming interface, from a database, one or more passwords associated with one or more user identification entries in the database that matches the user identification in response to the obtained query; determining, with one or more processors, whether the one or more passwords matches a password associated with the user identification; blocking, with one or more processors, access to a user account associated with the user identification and the password when the one or more passwords matches the password associated with the user identification; and notifying, with one or more processors, a user associated with the user account to reset the password when the one or more passwords matches the password associated with the user identification.

2. The medium of embodiment 1, wherein the operations comprise: obtaining the query at a scheduled time responsive to a scheduled batch process by which an intersection of a first set and a second set is determined, the first set comprising more than 100 million compromised credentials and the second set comprising more than 1 million credentials that afford access to a computer system.

3. The medium of any one of embodiments 1-2, wherein the query identifies a plurality of user identifications so as to retrieve, from the database, passwords associated with the plurality of user identifications.

4. The medium of any one of embodiments 1-3, wherein determining whether the one or more passwords match the password associated with the user identification comprises: determining whether one or more of the retrieved one or more passwords is a plaintext password; and determining whether the one or more of the retrieved one or more passwords match the password associated with the user identification when it is determined that the one or more of the retrieved one or more passwords is the plaintext password.

5. The medium of any one of embodiments 1-4, wherein the operations comprise: determining whether the user account associated with the user identification is an active user account; and determining whether the one or more passwords match the password associated with the user identification when it is determined that the user account associated with the user identification is the active user account.

6. The medium of embodiment 5, wherein determining whether the user account associated with the user identification is the active user account comprises: retrieving, from another database, a previous time stamp of access of the user account; and determining that the user account is the active user account when a time difference between the previous time stamp and a current time is less than a predetermined amount.

7. The medium of any one of embodiments 1-6, wherein notifying the user associated with the user account to reset the password comprises: notifying the user via another user identification associated with the user that is different from the user identification.

8. The medium of any one of embodiments 1-7, wherein notifying the user associated with the user account to reset the password comprises: notifying the user associated with the user account that the user account has been blocked and to reset the password when the user attempts to login using the user identification and the password associated with the user identification.

9. The medium of any one of embodiments 1-8, wherein the operations comprise: receiving, by a monitored computer system, via a network, a differential update from a remote credential-monitoring system of credentials determined to have been compromised since a previous update; writing the differential update to a compromised credential repository resident on a private network of the monitored computer system; selecting, by the monitored computer system, from a repository of active credentials of the monitored computer system, a subset of active credentials added to the repository since a previous batch process by which compromised credentials are compared to active credentials; and determining an intersection of credentials in the compromised credential repository with the subset of active credentials.

10. The medium of embodiment 9, wherein the operations comprise determining the intersection of credentials concurrently with operations comprising: replicating the subset of active credentials on each of a plurality of compute nodes of a compute cluster; storing different subsets of compromised credentials from the compromised credential repository on each of the different compute nodes; and comparing, with each of the compute nodes, a respective one of different subsets of compromised credentials stored on the respective compute node with each of the subset of active credentials with a content addressable data structure.

11. The medium of any one of embodiments 1-10, wherein the operations comprise: before obtaining the query, determining whether one or more of the retrieved one or more passwords is a non-plaintext password; cracking the one or more of the retrieved one or more passwords based on a rainbow table when it is determined that the one or more of the retrieved one or more passwords is the non-plaintext password; and determine whether a result of the password cracking matches the password associated with the user identification.

12. The medium of embodiment 11, wherein the operations comprise: blocking access to the user account associated with the user identification and the password when the result of the password cracking matches the password associated with the user identification; and notifying the user associated with the user account to reset the password when the result of the password cracking matches the password associated with the user identification.

13. The medium of any one of embodiments 1-12, wherein the operations comprise: determining whether the user account is being accessed at a time when it is determined that the one or more passwords matches the password associated with the user identification; and causing the user account to be automatically logged off after a threshold amount of time when it is determined that the user account is being accessed at the time when it is determined that the one or more passwords matches the password associated with the user identification.

14. The medium of any one of embodiments 1-13, wherein the operations comprise: determining an amount of times the user of the user account has been notified to change passwords associated with the user identification; determining the user account to be a high-risk user account when the amount of times satisfies a threshold; and notifying the user associated with the user account that the user account requires a two-factor authentication to be accessed when the user account is determined to be the high-risk user account.

15. The medium of any one of embodiments 1-14, wherein the operations comprise: granting access to the user account when the password has been reset.

16. The medium of any one of embodiments 1-15, wherein retrieving, via the application programming interface, from the database, the one or more passwords associated with the one or more user identification entries in the database that matches the user identification comprises: generating, via the application programming interface, a search query for retrieving data related to the user identification from the database in response to the obtained query; generating a criterion for the search query, the criterion being generated at least based on whether another query identifying the user identification has been previously obtained; and retrieving, via the application programming interface, from the database, the one or more passwords associated with the one or more user identification entries in the database that matches the user identification based on the search query and the criterion for the search query.

17. The medium of embodiment 16, wherein the retrieving the one or more passwords associated with the one or more user identification entries in the database that matches the user identification based on the search query and the criterion for the search query comprises: retrieving, via the application programming interface, from a subset of the database, the one or more passwords associated with the one or more user identification entries in the subset of the database that matches the user identification when it is determined that the other query identifying the user identification has been previously obtained.

18. The medium of embodiment 17, wherein: the subset of the database corresponds to a portion of the database populated with data on or after a date on which the other query identifying the user identification was previously obtained; and the operations comprise: determining whether the user account is being accessed at a time when it is determined that the one or more passwords matches the password associated with the user identification; and causing one or more functionalities of the user account to be disabled when it is determined that the user account is being accessed at the time when it is determined that the one or more passwords matches the password associated with the user identification.

19. A method comprising: the operations of any one of embodiments 1-18.

20. A system, comprising: one or more processors; and memory storing instructions that when executed by the processors cause the processors to effectuate operations comprising: the operations of any one of embodiments 1-18.

What is claimed is:

1. A tangible, non-transitory, machine-readable medium storing instructions that when executed by a computer system effectuate operations comprising:
   obtaining, with the computer system, a query identifying a user identification;
   retrieving, with the computer system, via an application programming interface, from a database, one or more passwords associated with one or more user identification entries in the database that matches the user identification in response to the obtained query;
   determining, with the computer system, whether a user account associated with the user identification is an active user account, wherein the determining whether the user account associated with the user identification is the active user account comprises:
      retrieving, from another database, a previous time stamp of access of the user account; and
      determining that the user account is the active user account when a time difference between the previous time stamp and a current time is less than a predetermined amount;
   determining, with the computer system, whether the one or more passwords matches a password associated with the user identification when it is determined that the user account associated with the user identification is the active user account;
   blocking, with the computer system, access to a user account associated with the user identification and the password when the one or more passwords matches the password associated with the user identification; and
   notifying, with the computer system, a user associated with the user account to reset the password when the one or more passwords matches the password associated with the user identification.

2. The medium of claim 1, wherein the operations comprise:
   obtaining the query at a scheduled time responsive to a scheduled batch process by which an intersection of a first set and a second set is determined, the first set comprising more than 100 million compromised credentials and the second set comprising more than 1 million credentials that afford access to another computer system.

3. The medium of claim 1, wherein the query identifies a plurality of user identifications so as to retrieve, from the database, passwords associated with the plurality of user identifications.

4. The medium of claim 1, wherein determining whether the one or more passwords match the password associated with the user identification comprises:
   determining whether one or more of the retrieved one or more passwords is a plaintext password; and
   determining whether the one or more of the retrieved one or more passwords match the password associated with the user identification when it is determined that the one or more of the retrieved one or more passwords is the plaintext password.

5. The medium of claim 1, wherein notifying the user associated with the user account to reset the password comprises:
   notifying the user via another user identification associated with the user that is different from the user identification.

6. The medium of claim 1, wherein notifying the user associated with the user account to reset the password comprises:

notifying the user associated with the user account that the user account has been blocked and to reset the password when the user attempts to login using the user identification and the password associated with the user identification.

7. The medium of claim 1, wherein the operations comprise:
receiving, by a monitored computer system, via a network, a differential update from a remote credential-monitoring system of credentials determined to have been compromised since a previous update;
writing the differential update to a compromised credential repository resident on a private network of the monitored computer system;
selecting, by the monitored computer system, from a repository of active credentials of the monitored computer system, a subset of active credentials added to the repository since a previous batch process by which compromised credentials are compared to active credentials; and
determining an intersection of credentials in the compromised credential repository with the subset of active credentials.

8. The medium of claim 7, wherein the operations comprise determining the intersection of credentials concurrently with operations comprising:
replicating the subset of active credentials on each of a plurality of compute nodes of a compute cluster;
storing different subsets of compromised credentials from the compromised credential repository on each of the different compute nodes; and
comparing, with each of the compute nodes, a respective one of different subsets of compromised credentials stored on the respective compute node with each of the subset of active credentials with a content addressable data structure.

9. The medium of claim 1, wherein the operations comprise:
before obtaining the query, determining whether one or more of the retrieved one or more passwords is a non-plaintext password;
cracking the one or more of the retrieved one or more passwords based on a rainbow table when it is determined that the one or more of the retrieved one or more passwords is the non-plaintext password; and
determining whether a result of the password cracking matches the password associated with the user identification.

10. The medium of claim 9, wherein the operations comprise:
blocking access to the user account associated with the user identification and the password when the result of the password cracking matches the password associated with the user identification; and
notifying the user associated with the user account to reset the password when the result of the password cracking matches the password associated with the user identification.

11. The medium of claim 1, wherein the operations comprise:
determining whether the user account is being accessed at a time when it is determined that the one or more passwords matches the password associated with the user identification; and
causing the user account to be automatically logged off after a threshold amount of time when it is determined that the user account is being accessed at the time when it is determined that the one or more passwords matches the password associated with the user identification.

12. The medium of claim 1, wherein the operations comprise:
determining an amount of times the user of the user account has been notified to change passwords associated with the user identification;
determining the user account to be a high-risk user account when the amount of times satisfies a threshold; and
notifying the user associated with the user account that the user account requires a two-factor authentication to be accessed when the user account is determined to be the high-risk user account.

13. The medium of claim 1, wherein the operations comprise:
granting access to the user account when the password has been reset.

14. The medium of claim 1, wherein retrieving, via the application programming interface, from the database, the one or more passwords associated with the one or more user identification entries in the database that matches the user identification comprises:
generating, via the application programming interface, a search query for retrieving data related to the user identification from the database in response to the obtained query;
generating a criterion for the search query, the criterion being generated at least based on whether another query identifying the user identification has been previously obtained; and
retrieving, via the application programming interface, from the database, the one or more passwords associated with the one or more user identification entries in the database that matches the user identification based on the search query and the criterion for the search query.

15. The medium of claim 14, wherein the retrieving the one or more passwords associated with the one or more user identification entries in the database that matches the user identification based on the search query and the criterion for the search query comprises:
retrieving, via the application programming interface, from a subset of the database, the one or more passwords associated with the one or more user identification entries in the subset of the database that matches the user identification when it is determined that the other query identifying the user identification has been previously obtained.

16. The medium of claim 15, wherein:
the subset of the database corresponds to a portion of the database populated with data on or after a date on which the other query identifying the user identification was previously obtained; and
the operations comprise:
determining whether the user account is being accessed at a time when it is determined that the one or more passwords matches the password associated with the user identification; and
causing one or more functionalities of the user account to be disabled when it is determined that the user account is being accessed at the time when it is determined that the one or more passwords matches the password associated with the user identification.

17. The medium of claim 1, wherein the operations comprise:

steps for determining an intersection of data sets; and
steps for performing a differential comparison relative to an earlier comparison.

18. A method that facilitates prevention of account takeover, the method comprising:
obtaining, with a computer system, a query identifying a user identification;
retrieving, with the computer system, via an application programming interface, from a database, one or more passwords associated with one or more user identification entries in the database that matches the user identification in response to the obtained query;
determining, with the computer system, whether a user account associated with the user identification is an active user account, wherein the determining whether the user account associated with the user identification is the active user account comprises:
retrieving, from another database, a previous time stamp of access of the user account; and
determining that the user account is the active user account when a time difference between the previous time stamp and a current time is less than a predetermined amount;
determining, with the computer system, whether the one or more passwords matches a password associated with the user identification when it is determined that the user account associated with the user identification is the active user account;
determining, with the computer system, whether the one or more passwords matches a password associated with the user identification;
blocking, with the computer system, access to a user account associated with the user identification and the password when the one or more passwords matches the password associated with the user identification; and
notifying, with the computer system, a user associated with the user account to reset the password when the one or more passwords matches the password associated with the user identification.

19. The method of claim 18, further comprising:
obtaining the query at a scheduled time responsive to a scheduled batch process by which an intersection of a first set and a second set is determined, the first set comprising more than 100 million compromised credentials and the second set comprising more than 1 million credentials that afford access to another computer system.

20. The method of claim 18, wherein the query identifies a plurality of user identifications so as to retrieve, from the database, passwords associated with the plurality of user identifications.

21. The method of claim 18, wherein determining whether the one or more passwords match the password associated with the user identification comprises:
determining whether one or more of the retrieved one or more passwords is a plaintext password; and
determining whether the one or more of the retrieved one or more passwords match the password associated with the user identification when it is determined that the one or more of the retrieved one or more passwords is the plaintext password.

22. The method of claim 18, wherein notifying the user associated with the user account to reset the password comprises:
notifying the user via another user identification associated with the user that is different from the user identification.

23. The method of claim 18, wherein notifying the user associated with the user account to reset the password comprises:
notifying the user associated with the user account that the user account has been blocked and to reset the password when the user attempts to login using the user identification and the password associated with the user identification.

24. The method of claim 18, further comprising:
receiving, by a monitored computer system, via a network, a differential update from a remote credential-monitoring system of credentials determined to have been compromised since a previous update;
writing the differential update to a compromised credential repository resident on a private network of the monitored computer system;
selecting, by the monitored computer system, from a repository of active credentials of the monitored computer system, a subset of active credentials added to the repository since a previous batch process by which compromised credentials are compared to active credentials; and
determining an intersection of credentials in the compromised credential repository with the subset of active credentials.

25. The method of claim 24, wherein the determining the intersection of credentials concurrently with operations comprises:
replicating the subset of active credentials on each of a plurality of compute nodes of a compute cluster;
storing different subsets of compromised credentials from the compromised credential repository on each of the different compute nodes; and
comparing, with each of the compute nodes, a respective one of different subsets of compromised credentials stored on the respective compute node with each of the subset of active credentials with a content addressable data structure.

26. The method of claim 18, further comprising:
before obtaining the query, determining whether one or more of the retrieved one or more passwords is a non-plaintext password;
cracking the one or more of the retrieved one or more passwords based on a rainbow table when it is determined that the one or more of the retrieved one or more passwords is the non-plaintext password; and
determining whether a result of the password cracking matches the password associated with the user identification.

27. The method of claim 26, further comprising:
blocking access to the user account associated with the user identification and the password when the result of the password cracking matches the password associated with the user identification; and
notifying the user associated with the user account to reset the password when the result of the password cracking matches the password associated with the user identification.

28. The method of claim 18, further comprising:
determining whether the user account is being accessed at a time when it is determined that the one or more passwords matches the password associated with the user identification; and
causing the user account to be automatically logged off after a threshold amount of time when it is determined that the user account is being accessed at the time when it is determined that the one or more passwords matches the password associated with the user identification.

29. The method of claim 18, further comprising:
determining an amount of times the user of the user account has been notified to change passwords associated with the user identification;
determining the user account to be a high-risk user account when the amount of times satisfies a threshold; and
notifying the user associated with the user account that the user account requires a two-factor authentication to be accessed when the user account is determined to be the high-risk user account.

30. The method of claim 18, further comprising:
granting access to the user account when the password has been reset.

31. The method of claim 18, wherein the retrieving, via the application programming interface, from the database, the one or more passwords associated with the one or more user identification entries in the database that matches the user identification comprises:
generating, via the application programming interface, a search query for retrieving data related to the user identification from the database in response to the obtained query;
generating a criterion for the search query, the criterion being generated at least based on whether another query identifying the user identification has been previously obtained; and
retrieving, via the application programming interface, from the database, the one or more passwords associated with the one or more user identification entries in the database that matches the user identification based on the search query and the criterion for the search query.

32. The method of claim 31, wherein the retrieving the one or more passwords associated with the one or more user identification entries in the database that matches the user identification based on the search query and the criterion for the search query comprises:
retrieving, via the application programming interface, from a subset of the database, the one or more passwords associated with the one or more user identification entries in the subset of the database that matches the user identification when it is determined that the other query identifying the user identification has been previously obtained.

33. The method of claim 32, wherein:
the subset of the database corresponds to a portion of the database populated with data on or after a date on which the other query identifying the user identification was previously obtained; and
further comprising:
determining whether the user account is being accessed at a time when it is determined that the one or more passwords matches the password associated with the user identification; and
causing one or more functionalities of the user account to be disabled when it is determined that the user account is being accessed at the time when it is determined that the one or more passwords matches the password associated with the user identification.

34. The method of claim 18, further comprising:
steps for determining an intersection of data sets; and
steps for performing a differential comparison relative to an earlier comparison.

35. A tangible, non-transitory, machine-readable medium storing instructions that when executed by a computer system effectuate operations comprising:
obtaining, with the computer system, a query identifying a user identification;
retrieving, with the computer system, via an application programming interface, from a database, one or more passwords associated with one or more user identification entries in the database that matches the user identification in response to the obtained query;
determining, with one or more processors, whether the one or more passwords matches a password associated with the user identification;
blocking, with the computer system, access to a user account associated with the user identification and the password when the one or more passwords matches the password associated with the user identification;
notifying, with the computer system, a user associated with the user account to reset the password when the one or more passwords matches the password associated with the user identification;
determining, with the computer system, an amount of times the user of the user account has been notified to change passwords associated with the user identification;
determining, with the computer system, the user account to be a high-risk user account when the amount of times satisfies a threshold; and
notifying the user associated with the user account that the user account requires a two-factor authentication to be accessed when the user account is determined to be the high-risk user account.

36. The medium of claim 35, wherein the operations comprise:
obtaining the query at a scheduled time responsive to a scheduled batch process by which an intersection of a first set and a second set is determined, the first set comprising more than 100 million compromised credentials and the second set comprising more than 1 million credentials that afford access to another computer system.

37. The medium of claim 35, wherein the query identifies a plurality of user identifications so as to retrieve, from the database, passwords associated with the plurality of user identifications.

38. The medium of claim 35, wherein determining whether the one or more passwords match the password associated with the user identification comprises:
determining whether one or more of the retrieved one or more passwords is a plaintext password; and
determining whether the one or more of the retrieved one or more passwords match the password associated with the user identification when it is determined that the one or more of the retrieved one or more passwords is the plaintext password.

39. The medium of claim 35, wherein the operations comprise:
determining whether the user account associated with the user identification is an active user account; and
determining whether the one or more passwords match the password associated with the user identification when it is determined that the user account associated with the user identification is the active user account.

40. The medium of claim 39, wherein determining whether the user account associated with the user identification is the active user account comprises:

retrieving, from another database, a previous time stamp of access of the user account; and determining that the user account is the active user account when a time difference between the previous time stamp and a current time is less than a predetermined amount.

41. The medium of claim 35, wherein notifying the user associated with the user account to reset the password comprises:

notifying the user via another user identification associated with the user that is different from the user identification.

42. The medium of claim 35, wherein notifying the user associated with the user account to reset the password comprises:

notifying the user associated with the user account that the user account has been blocked and to reset the password when the user attempts to login using the user identification and the password associated with the user identification.

43. The medium of claim 35, wherein the operations comprise:

receiving, by a monitored computer system, via a network, a differential update from a remote credential-monitoring system of credentials determined to have been compromised since a previous update;

writing the differential update to a compromised credential repository resident on a private network of the monitored computer system;

selecting, by the monitored computer system, from a repository of active credentials of the monitored computer system, a subset of active credentials added to the repository since a previous batch process by which compromised credentials are compared to active credentials; and determining an intersection of credentials in the compromised credential repository with the subset of active credentials.

44. The medium of claim 43, wherein the operations comprise determining the intersection of credentials concurrently with operations comprising:

replicating the subset of active credentials on each of a plurality of compute nodes of a compute cluster;

storing different subsets of compromised credentials from the compromised credential repository on each of the different compute nodes; and comparing, with each of the compute nodes, a respective one of different subsets of compromised credentials stored on the respective compute node with each of the subset of active credentials with a content addressable data structure.

45. The medium of claim 35, wherein the operations comprise:

before obtaining the query, determining whether one or more of the retrieved one or more passwords is a non-plaintext password;

cracking the one or more of the retrieved one or more passwords based on a rainbow table when it is determined that the one or more of the retrieved one or more passwords is the non-plaintext password; and determining whether a result of the password cracking matches the password associated with the user identification.

46. The medium of claim 45, wherein the operations comprise:

blocking access to the user account associated with the user identification and the password when the result of the password cracking matches the password associated with the user identification; and notifying the user associated with the user account to reset the password when the result of the password cracking matches the password associated with the user identification.

47. The medium of claim 35, wherein the operations comprise:

determining whether the user account is being accessed at a time when it is determined that the one or more passwords matches the password associated with the user identification; and causing the user account to be automatically logged off after a threshold amount of time when it is determined that the user account is being accessed at the time when it is determined that the one or more passwords matches the password associated with the user identification.

48. The medium of claim 35, wherein the operations comprise:

granting access to the user account when the password has been reset.

49. The medium of claim 35, wherein retrieving, via the application programming interface, from the database, the one or more passwords associated with the one or more user identification entries in the database that matches the user identification comprises:

generating, via the application programming interface, a search query for retrieving data related to the user identification from the database in response to the obtained query;

generating a criterion for the search query, the criterion being generated at least based on whether another query identifying the user identification has been previously obtained; and retrieving, via the application programming interface, from the database, the one or more passwords associated with the one or more user identification entries in the database that matches the user identification based on the search query and the criterion for the search query.

50. The medium of claim 49, wherein the retrieving the one or more passwords associated with the one or more user identification entries in the database that matches the user identification based on the search query and the criterion for the search query comprises:

retrieving, via the application programming interface, from a subset of the database, the one or more passwords associated with the one or more user identification entries in the subset of the database that matches the user identification when it is determined that the other query identifying the user identification has been previously obtained.

51. The medium of claim 50, wherein:

the subset of the database corresponds to a portion of the database populated with data on or after a date on which the other query identifying the user identification was previously obtained; and the operations comprise:

determining whether the user account is being accessed at a time when it is determined that the one or more passwords matches the password associated with the user identification; and causing one or more functionalities of the user account to be disabled when it is determined that the user account is being accessed at the time when it is determined that the one or more passwords matches the password associated with the user identification.

52. The medium of claim 35, wherein the operations comprise:
    steps for determining an intersection of data sets; and
    steps for performing a differential comparison relative to an earlier comparison.

53. A method that facilitates prevention of account takeover, the method comprising:
    obtaining, with a computer system, a query identifying a user identification; and
    retrieving, with the computer system, via an application programming interface, from a database, one or more passwords associated with one or more user identification entries in the database that matches the user identification in response to the obtained query;
    determining, with one or more processors, whether the one or more passwords matches a password associated with the user identification;
    blocking, with the computer system, access to a user account associated with the user identification and the password when the one or more passwords matches the password associated with the user identification;
    notifying, with the computer system, a user associated with the user account to reset the password when the one or more passwords matches the password associated with the user identification;
    determining, with the computer system, an amount of times the user of the user account has been notified to change passwords associated with the user identification;
    determining, with the computer system, the user account to be a high-risk user account when the amount of times satisfies a threshold; and
    notifying the user associated with the user account that the user account requires a two-factor authentication to be accessed when the user account is determined to be the high-risk user account.

54. The method of claim 53, further comprising:
    obtaining the query at a scheduled time responsive to a scheduled batch process by which an intersection of a first set and a second set is determined, the first set comprising more than 100 million compromised credentials and the second set comprising more than 1 million credentials that afford access to another computer system.

55. The method of claim 53, wherein the query identifies a plurality of user identifications so as to retrieve, from the database, passwords associated with the plurality of user identifications.

56. The method of claim 53, wherein determining whether the one or more passwords match the password associated with the user identification comprises:
    determining whether one or more of the retrieved one or more passwords is a plaintext password; and
    determining whether the one or more of the retrieved one or more passwords match the password associated with the user identification when it is determined that the one or more of the retrieved one or more passwords is the plaintext password.

57. The method of claim 53, further comprising:
    determining whether the user account associated with the user identification is an active user account; and
    determining whether the one or more passwords match the password associated with the user identification when it is determined that the user account associated with the user identification is the active user account.

58. The method of claim 57, wherein determining whether the user account associated with the user identification is the active user account comprises:
    retrieving, from another database, a previous time stamp of access of the user account; and
    determining that the user account is the active user account when a time difference between the previous time stamp and a current time is less than a predetermined amount.

59. The method of claim 53, wherein notifying the user associated with the user account to reset the password comprises:
    notifying the user via another user identification associated with the user that is different from the user identification.

60. The method of claim 53, wherein notifying the user associated with the user account to reset the password comprises:
    notifying the user associated with the user account that the user account has been blocked and to reset the password when the user attempts to login using the user identification and the password associated with the user identification.

61. The method of claim 53, further comprising:
    receiving, by a monitored computer system, via a network, a differential update from a remote credential-monitoring system of credentials determined to have been compromised since a previous update;
    writing the differential update to a compromised credential repository resident on a private network of the monitored computer system;
    selecting, by the monitored computer system, from a repository of active credentials of the monitored computer system, a subset of active credentials added to the repository since a previous batch process by which compromised credentials are compared to active credentials; and
    determining an intersection of credentials in the compromised credential repository with the subset of active credentials.

62. The method of claim 61, wherein the determining the intersection of credentials concurrently comprises:
    replicating the subset of active credentials on each of a plurality of compute nodes of a compute cluster;
    storing different subsets of compromised credentials from the compromised credential repository on each of the different compute nodes; and
    comparing, with each of the compute nodes, a respective one of different subsets of compromised credentials stored on the respective compute node with each of the subset of active credentials with a content addressable data structure.

63. The method of claim 53, further comprising:
    before obtaining the query, determining whether one or more of the retrieved one or more passwords is a non-plaintext password;
    cracking the one or more of the retrieved one or more passwords based on a rainbow table when it is determined that the one or more of the retrieved one or more passwords is the non-plaintext password; and
    determining whether a result of the password cracking matches the password associated with the user identification.

64. The method of claim 63, further comprising:
    blocking access to the user account associated with the user identification and the password when the result of the password cracking matches the password associated with the user identification; and
notifying the user associated with the user account to reset the password when the result of the password cracking matches the password associated with the user identification.

65. The method of claim 53, further comprising:
determining whether the user account is being accessed at a time when it is determined that the one or more passwords matches the password associated with the user identification; and
causing the user account to be automatically logged off after a threshold amount of time when it is determined that the user account is being accessed at the time when it is determined that the one or more passwords matches the password associated with the user identification.

66. The method of claim 53, further comprising:
granting access to the user account when the password has been reset.

67. The method of claim 53, wherein retrieving, via the application programming interface, from the database, the one or more passwords associated with the one or more user identification entries in the database that matches the user identification comprises:
generating, via the application programming interface, a search query for retrieving data related to the user identification from the database in response to the obtained query;
generating a criterion for the search query, the criterion being generated at least based on whether another query identifying the user identification has been previously obtained; and
retrieving, via the application programming interface, from the database, the one or more passwords associated with the one or more user identification entries in the database that matches the user identification based on the search query and the criterion for the search query.

68. The method of claim 67, wherein the retrieving the one or more passwords associated with the one or more user identification entries in the database that matches the user identification based on the search query and the criterion for the search query comprises:
retrieving, via the application programming interface, from a subset of the database, the one or more passwords associated with the one or more user identification entries in the subset of the database that matches the user identification when it is determined that the other query identifying the user identification has been previously obtained.

69. The method of claim 68, wherein:
the subset of the database corresponds to a portion of the database populated with data on or after a date on which the other query identifying the user identification was previously obtained; and
further comprising:
determining whether the user account is being accessed at a time when it is determined that the one or more passwords matches the password associated with the user identification; and
causing one or more functionalities of the user account to be disabled when it is determined that the user account is being accessed at the time when it is determined that the one or more passwords matches the password associated with the user identification.

70. The method of claim 53, further comprising:
steps for determining an intersection of data sets; and
steps for performing a differential comparison relative to an earlier comparison.

71. A tangible, non-transitory, machine-readable medium storing instructions that when executed by a computer system effectuate operations comprising:
obtaining, with the computer system, a query identifying a user identification, wherein the query is obtained at a scheduled time responsive to a scheduled batch process by which an intersection of a first set and a second set is determined, the first set comprising more than 100 million compromised credentials and the second set comprising more than 1 million credentials that afford access to another computer system;
retrieving, with the computer system, via an application programming interface, from a database, one or more passwords associated with one or more user identification entries in the database that matches the user identification in response to the obtained query;
determining, with the computer system, whether the one or more passwords matches a password associated with the user identification;
blocking, with the computer system, access to a user account associated with the user identification and the password when the one or more passwords matches the password associated with the user identification; and
notifying, with the computer system, a user associated with the user account to reset the password when the one or more passwords matches the password associated with the user identification.

72. The medium of claim 71, wherein the query identifies a plurality of user identifications so as to retrieve, from the database, passwords associated with the plurality of user identifications.

73. The medium of claim 71, wherein determining whether the one or more passwords match the password associated with the user identification comprises:
determining whether one or more of the retrieved one or more passwords is a plaintext password; and
determining whether the one or more of the retrieved one or more passwords match the password associated with the user identification when it is determined that the one or more of the retrieved one or more passwords is the plaintext password.

74. The medium of claim 71, wherein the operations comprise:
determining whether the user account associated with the user identification is an active user account; and
determining whether the one or more passwords match the password associated with the user identification when it is determined that the user account associated with the user identification is the active user account.

75. The medium of claim 74, wherein determining whether the user account associated with the user identification is the active user account comprises:
retrieving, from another database, a previous time stamp of access of the user account; and
determining that the user account is the active user account when a time difference between the previous time stamp and a current time is less than a predetermined amount.

76. The medium of claim 71, wherein notifying the user associated with the user account to reset the password comprises:
notifying the user via another user identification associated with the user that is different from the user identification.

77. The medium of claim 71, wherein notifying the user associated with the user account to reset the password comprises:
  notifying the user associated with the user account that the user account has been blocked and to reset the password when the user attempts to login using the user identification and the password associated with the user identification.

78. The medium of claim 71, wherein the operations comprise:
  receiving, by a monitored computer system, via a network, a differential update from a remote credential-monitoring system of credentials determined to have been compromised since a previous update;
  writing the differential update to a compromised credential repository resident on a private network of the monitored computer system;
  selecting, by the monitored computer system, from a repository of active credentials of the monitored computer system, a subset of active credentials added to the repository since a previous batch process by which compromised credentials are compared to active credentials; and
  determining an intersection of credentials in the compromised credential repository with the subset of active credentials.

79. The medium of claim 78, wherein the operations comprise determining the intersection of credentials concurrently with operations comprising:
  replicating the subset of active credentials on each of a plurality of compute nodes of a compute cluster;
  storing different subsets of compromised credentials from the compromised credential repository on each of the different compute nodes; and
  comparing, with each of the compute nodes, a respective one of different subsets of compromised credentials stored on the respective compute node with each of the subset of active credentials with a content addressable data structure.

80. The medium of claim 71, wherein the operations comprise:
  before obtaining the query, determining whether one or more of the retrieved one or more passwords is a non-plaintext password;
  cracking the one or more of the retrieved one or more passwords based on a rainbow table when it is determined that the one or more of the retrieved one or more passwords is the non-plaintext password; and
  determining whether a result of the password cracking matches the password associated with the user identification.

81. The medium of claim 80, wherein the operations comprise:
  blocking access to the user account associated with the user identification and the password when the result of the password cracking matches the password associated with the user identification; and
  notifying the user associated with the user account to reset the password when the result of the password cracking matches the password associated with the user identification.

82. The medium of claim 71, wherein the operations comprise:
  determining whether the user account is being accessed at a time when it is determined that the one or more passwords matches the password associated with the user identification; and
  causing the user account to be automatically logged off after a threshold amount of time when it is determined that the user account is being accessed at the time when it is determined that the one or more passwords matches the password associated with the user identification.

83. The medium of claim 71, wherein the operations comprise:
  determining an amount of times the user of the user account has been notified to change passwords associated with the user identification;
  determining the user account to be a high-risk user account when the amount of times satisfies a threshold; and
  notifying the user associated with the user account that the user account requires a two-factor authentication to be accessed when the user account is determined to be the high-risk user account.

84. The medium of claim 71, wherein the operations comprise:
  granting access to the user account when the password has been reset.

85. The medium of claim 71, wherein retrieving, via the application programming interface, from the database, the one or more passwords associated with the one or more user identification entries in the database that matches the user identification comprises:
  generating, via the application programming interface, a search query for retrieving data related to the user identification from the database in response to the obtained query;
  generating a criterion for the search query, the criterion being generated at least based on whether another query identifying the user identification has been previously obtained; and
  retrieving, via the application programming interface, from the database, the one or more passwords associated with the one or more user identification entries in the database that matches the user identification based on the search query and the criterion for the search query.

86. The medium of claim 85, wherein the retrieving the one or more passwords associated with the one or more user identification entries in the database that matches the user identification based on the search query and the criterion for the search query comprises:
  retrieving, via the application programming interface, from a subset of the database, the one or more passwords associated with the one or more user identification entries in the subset of the database that matches the user identification when it is determined that the other query identifying the user identification has been previously obtained.

87. The medium of claim 86, wherein:
  the subset of the database corresponds to a portion of the database populated with data on or after a date on which the other query identifying the user identification was previously obtained; and
  the operations comprise:
    determining whether the user account is being accessed at a time when it is determined that the one or more passwords matches the password associated with the user identification; and
    causing one or more functionalities of the user account to be disabled when it is determined that the user account is being accessed at the time when it is determined that the one or more passwords matches the password associated with the user identification.

88. The medium of claim 71, wherein the operations comprise:
steps for determining an intersection of data sets; and
steps for performing a differential comparison relative to an earlier comparison.

89. A method that facilitates prevention of account takeover, the method comprising:
obtaining, with a computer system, a query identifying a user identification, wherein the query is obtained at a scheduled time responsive to a scheduled batch process by which an intersection of a first set and a second set is determined, the first set comprising more than 100 million compromised credentials and the second set comprising more than 1 million credentials that afford access to a second computer system;
retrieving, with the computer system, via an application programming interface, from a database, one or more passwords associated with one or more user identification entries in the database that matches the user identification in response to the obtained query;
determining, with the computer system, whether the one or more passwords matches a password associated with the user identification;
blocking, with the computer system, access to a user account associated with the user identification and the password when the one or more passwords matches the password associated with the user identification; and
notifying, with the computer system, a user associated with the user account to reset the password when the one or more passwords matches the password associated with the user identification.

90. The method of claim 89, wherein the query identifies a plurality of user identifications so as to retrieve, from the database, passwords associated with the plurality of user identifications.

91. The method of claim 89, wherein determining whether the one or more passwords match the password associated with the user identification comprises:
determining whether one or more of the retrieved one or more passwords is a plaintext password; and
determining whether the one or more of the retrieved one or more passwords match the password associated with the user identification when it is determined that the one or more of the retrieved one or more passwords is the plaintext password.

92. The method of claim 89, further comprising:
determining whether the user account associated with the user identification is an active user account; and
determining whether the one or more passwords match the password associated with the user identification when it is determined that the user account associated with the user identification is the active user account.

93. The method of claim 92, wherein determining whether the user account associated with the user identification is the active user account comprises:
retrieving, from another database, a previous time stamp of access of the user account; and
determining that the user account is the active user account when a time difference between the previous time stamp and a current time is less than a predetermined amount.

94. The method of claim 89, wherein notifying the user associated with the user account to reset the password comprises:
notifying the user via another user identification associated with the user that is different from the user identification.

95. The method of claim 89, wherein notifying the user associated with the user account to reset the password comprises:
notifying the user associated with the user account that the user account has been blocked and to reset the password when the user attempts to login using the user identification and the password associated with the user identification.

96. The method of claim 89, further comprising:
receiving, by a monitored computer system, via a network, a differential update from a remote credential-monitoring system of credentials determined to have been compromised since a previous update;
writing the differential update to a compromised credential repository resident on a private network of the monitored computer system;
selecting, by the monitored computer system, from a repository of active credentials of the monitored computer system, a subset of active credentials added to the repository since a previous batch process by which compromised credentials are compared to active credentials; and
determining an intersection of credentials in the compromised credential repository with the subset of active credentials.

97. The method of claim 96, wherein the determining the intersection of credentials concurrently comprises:
replicating the subset of active credentials on each of a plurality of compute nodes of a compute cluster;
storing different subsets of compromised credentials from the compromised credential repository on each of the different compute nodes; and
comparing, with each of the compute nodes, a respective one of different subsets of compromised credentials stored on the respective compute node with each of the subset of active credentials with a content addressable data structure.

98. The method of claim 89, further comprising:
before obtaining the query, determining whether one or more of the retrieved one or more passwords is a non-plaintext password;
cracking the one or more of the retrieved one or more passwords based on a rainbow table when it is determined that the one or more of the retrieved one or more passwords is the non-plaintext password; and
determining whether a result of the password cracking matches the password associated with the user identification.

99. The method of claim 98, further comprising:
blocking access to the user account associated with the user identification and the password when the result of the password cracking matches the password associated with the user identification; and
notifying the user associated with the user account to reset the password when the result of the password cracking matches the password associated with the user identification.

100. The method of claim 89, further comprising:
determining whether the user account is being accessed at a time when it is determined that the one or more passwords matches the password associated with the user identification; and
causing the user account to be automatically logged off after a threshold amount of time when it is determined that the user account is being accessed at the time when it is determined that the one or more passwords matches the password associated with the user identification.

101. The method of claim 89, further comprising:
determining an amount of times the user of the user account has been notified to change passwords associated with the user identification;
determining the user account to be a high-risk user account when the amount of times satisfies a threshold; and
notifying the user associated with the user account that the user account requires a two-factor authentication to be accessed when the user account is determined to be the high-risk user account.

102. The method of claim 89, further comprising:
granting access to the user account when the password has been reset.

103. The method of claim 89, wherein retrieving, via the application programming interface, from the database, the one or more passwords associated with the one or more user identification entries in the database that matches the user identification comprises:
generating, via the application programming interface, a search query for retrieving data related to the user identification from the database in response to the obtained query;
generating a criterion for the search query, the criterion being generated at least based on whether another query identifying the user identification has been previously obtained; and
retrieving, via the application programming interface, from the database, the one or more passwords associated with the one or more user identification entries in the database that matches the user identification based on the search query and the criterion for the search query.

104. The method of claim 103, wherein the retrieving the one or more passwords associated with the one or more user identification entries in the database that matches the user identification based on the search query and the criterion for the search query comprises:
retrieving, via the application programming interface, from a subset of the database, the one or more passwords associated with the one or more user identification entries in the subset of the database that matches the user identification when it is determined that the other query identifying the user identification has been previously obtained.

105. The method of claim 104, wherein:
the subset of the database corresponds to a portion of the database populated with data on or after a date on which the other query identifying the user identification was previously obtained; and
further comprising:
determining whether the user account is being accessed at a time when it is determined that the one or more passwords matches the password associated with the user identification; and
causing one or more functionalities of the user account to be disabled when it is determined that the user account is being accessed at the time when it is determined that the one or more passwords matches the password associated with the user identification.

106. The method of claim 89, further comprising:
steps for determining an intersection of data sets; and
steps for performing a differential comparison relative to an earlier comparison.

* * * * *